US012645630B2

(12) United States Patent
Trombley et al.

(10) Patent No.: US 12,645,630 B2
(45) Date of Patent: Jun. 2, 2026

(54) UNGROUPING AND GROUPING OF SYSTEM BUSSES USING LINK MACROS CAPABLE OF JOINING AND SPLITTING

(71) Applicant: Microsoft Technology Licensing, LLC, Redmond, WA (US)

(72) Inventors: Michael Raymond Trombley, Cary, NC (US); Charles Walter Boecker, Ames, IA (US); Simon Shichi Li, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/739,825

(22) Filed: Jun. 11, 2024

(65) Prior Publication Data

US 2025/0378040 A1     Dec. 11, 2025

(51) Int. Cl.
*G06F 13/40*     (2006.01)
*G06F 13/38*     (2006.01)
*G06F 13/42*     (2006.01)

(52) U.S. Cl.
CPC .......... *G06F 13/4068* (2013.01); *G06F 13/38* (2013.01); *G06F 13/42* (2013.01)

(58) Field of Classification Search
CPC ...... G06F 13/4068; G06F 13/42; G06F 13/14; G06F 13/38; G06F 15/7807; G06F 15/7896; G06F 7/24; G06F 7/36
See application file for complete search history.

(56) References Cited

U.S. PATENT DOCUMENTS 7,173,936 B1     2/2007 Semaan
9,559,753 B2 *   1/2017 McCormack ............ H04B 5/79
2023/0299851 A1 * 9/2023 Fryman ................ H04B 10/502
                                                    398/115

FOREIGN PATENT DOCUMENTS

WO          2023163954 A1     8/2023

OTHER PUBLICATIONS

"Bunch of Wires (BoW) PHY Specification", Open Compute Project, Mar. 1, 2023, 51 Pages.
"Chapter 8: Single Chip and Multi-Chip Integration", Heterogeneous Integration Roadmap, 2020, 71 Pages.
(Continued)

*Primary Examiner* — Idriss N Alrobaye
*Assistant Examiner* — Richard B Franklin
(74) *Attorney, Agent, or Firm* — Michael T. Abramson; Jordan IP Law, LLC

(57)     ABSTRACT
Ungrouping and grouping of system busses using link macros capable of joining and splitting is described. A method for communication between a first die and a second die in a multi-die system, where the first die comprises a set of D2D transmit link macros, and where each of the set of D2D link transmit macros has a same bandwidth capacity per transmit link macro, includes ungrouping data received from any of the system busses into a first group of data and a second group of data when a bandwidth of a respective system bus exceeds the bandwidth capacity per transmit link macro. The method further includes using a first D2D transmit link macro, transmitting the first group of data to the second die. The method further includes joining the second group of data with a third group of data for transmission using a shared transmit link macro.

20 Claims, 21 Drawing Sheets

(56) References Cited

OTHER PUBLICATIONS

Bulzacchelli, et al., "A 28-GB/s 4-Tap FFE/15-Tap DFE Serial Link Transceiver in 32-nm SOI CMOS Technology", IEEE Journal of Solid-State Circuits, vol. 47, Issue 12, Dec. 2012, 18 Pages.

Lee, et al., "Low-Power Area-Efficient High-Speed I/O Circuit Techniques", IEEE Journal of Solid-State Circuits, vol. 35, Issue 11, Nov. 2000, pp. 1591-1599.

Ma, et al., "OpenHBI Specification Version 1.0", Open Compute Project, Sep. 29, 2021, 74 Pages.

Sharma, et al., "Building an open ecosystem of chiplets for on-package innovations", Universal Chiplet Interconnect Express™, 2023, 24 Pages.

International Search Report and Written Opinion mailed on Jun. 12, 2025 for PCT Application No. PCT/US2025/019083, 16 pages.

* cited by examiner

300

NORTH

-DIE EDGE-

WEST ←          → EAST

SOUTH

500

600

800

900

1200

1300

1800

Figure 21:
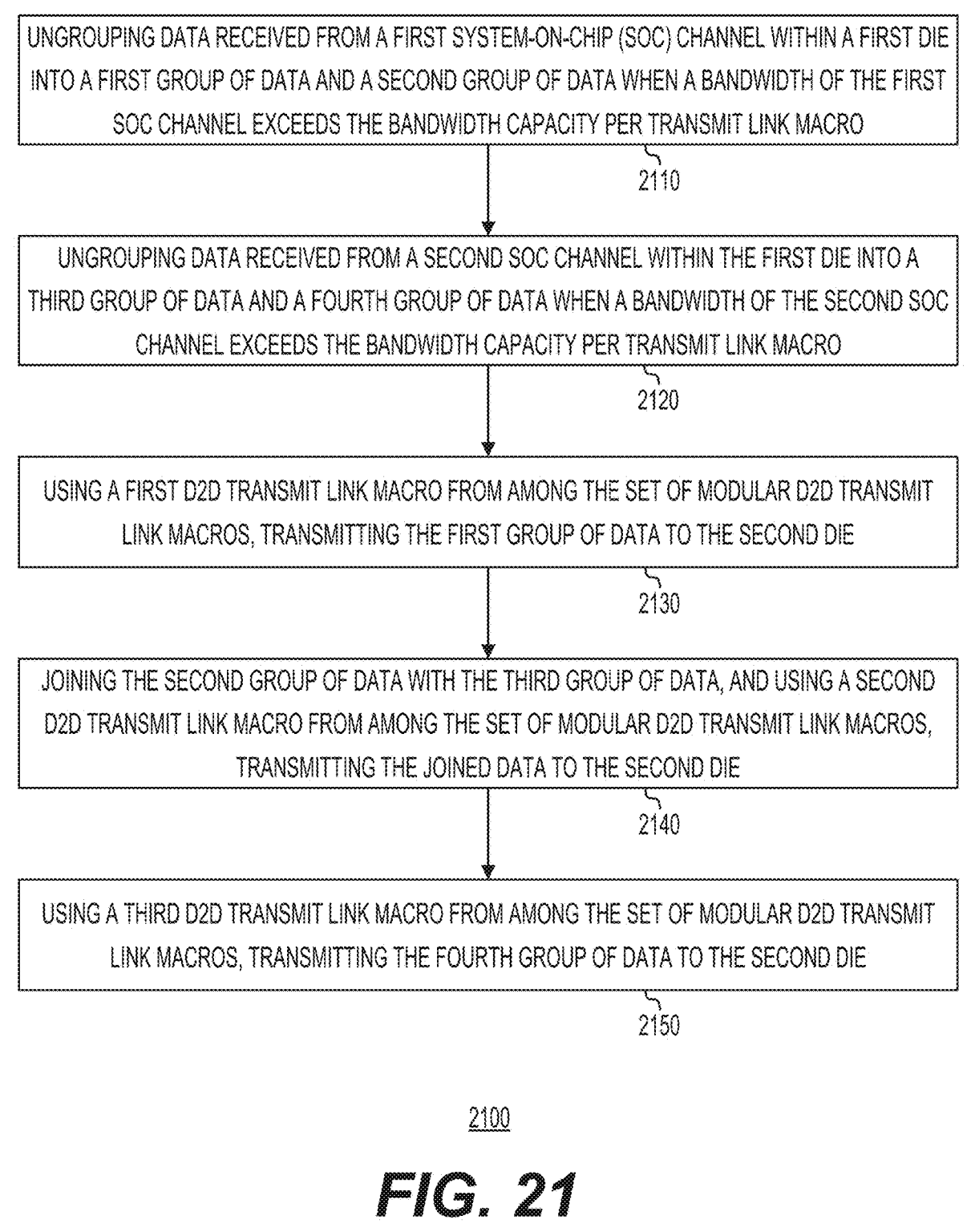

UNGROUPING DATA RECEIVED FROM A FIRST SYSTEM-ON-CHIP (SOC) CHANNEL WITHIN A FIRST DIE INTO A FIRST GROUP OF DATA AND A SECOND GROUP OF DATA WHEN A BANDWIDTH OF THE FIRST SOC CHANNEL EXCEEDS THE BANDWIDTH CAPACITY PER TRANSMIT LINK MACRO

2110

UNGROUPING DATA RECEIVED FROM A SECOND SOC CHANNEL WITHIN THE FIRST DIE INTO A THIRD GROUP OF DATA AND A FOURTH GROUP OF DATA WHEN A BANDWIDTH OF THE SECOND SOC CHANNEL EXCEEDS THE BANDWIDTH CAPACITY PER TRANSMIT LINK MACRO

2120

USING A FIRST D2D TRANSMIT LINK MACRO FROM AMONG THE SET OF MODULAR D2D TRANSMIT LINK MACROS, TRANSMITTING THE FIRST GROUP OF DATA TO THE SECOND DIE

2130

JOINING THE SECOND GROUP OF DATA WITH THE THIRD GROUP OF DATA, AND USING A SECOND D2D TRANSMIT LINK MACRO FROM AMONG THE SET OF MODULAR D2D TRANSMIT LINK MACROS, TRANSMITTING THE JOINED DATA TO THE SECOND DIE

2140

USING A THIRD D2D TRANSMIT LINK MACRO FROM AMONG THE SET OF MODULAR D2D TRANSMIT LINK MACROS, TRANSMITTING THE FOURTH GROUP OF DATA TO THE SECOND DIE

UNGROUPING AND GROUPING OF SYSTEM BUSSES USING LINK MACROS CAPABLE OF JOINING AND SPLITTING

BACKGROUND

Die-to-die (D2D) links are an integral aspect of advanced packaging technologies, including packaging technologies for integrating separate dies into multi-die systems. Example topologies of integrated dies include horizontally integrated dies (e.g., chiplets in a plane) and vertically-integrated dies (e.g., 2.5D, 3D, and silicon bridge topologies). A large monolithic chip, e.g., a system on chip (SoC), can be split into multiple smaller dies, which are referred to as chiplets. Example protocols for interconnecting the dies, including chiplets, in such topologies include Universal Chiplet Interconnect Express (UCIe), Bunch Of Wires (BOW), and OCP's OpenHBI Specification (OHBI).

Die-to-Die (D2D) links are used to integrate portions (located on separate chiplets/dies) of large systems, such as SoCs, into a single system. The bandwidth required from the D2D links across a die edge can be asymmetrical or symmetrical. As an example, a certain application may require more transmit bandwidth than receive bandwidth while another may require the opposite. For example, D2D links from an SoC chiplet to an HBM chiplet may be required to support more bandwidth for read operations relative to the write operations. Current standards (UCIe, BoW, OHBI) for interconnecting dies/chiplets assume symmetrical interfaces with respect to bandwidth. The implementation of D2D links based on such standards invariably results in both wasted power and area for at least one of the two dies being linked. On the other hand, the use of custom implementations of D2D links to interconnect dies/chiplets for different applications also has significant downsides in terms of both design and testing inefficiencies.

Accordingly, there is a need for ungrouping and grouping of system busses using link macros capable of joining and splitting.

SUMMARY

In one example, the present disclosure relates to a method for communication between a first die and a second die in a multi-die system, where the first die comprises a set of D2D transmit link macros, where each of the set of D2D link transmit macros has a same bandwidth capacity per transmit link macro. The method includes ungrouping data received from a first system-on-chip (SoC) channel within the first die into a first group of data and a second group of data when a bandwidth of the first SoC channel exceeds the bandwidth capacity per transmit link macro.

The method further includes ungrouping data received from a second SoC channel within the first die into a third group of data and a fourth group of data when a bandwidth of the second SoC channel exceeds the bandwidth capacity per transmit link macro. The method further includes using a first D2D transmit link macro from among the set of D2D transmit link macros, transmitting the first group of data to the second die.

The method further includes joining the second group of data with the third group of data, and using a second D2D transmit link macro from among the set of D2D transmit link macros, transmitting the joined data to the second die. The method further includes using a third D2D transmit link macro from among the set of D2D transmit link macros, transmitting the fourth group of data to the second die.

In another example, the present disclosure relates to a multi-die system including a first die coupled to a second die via die-to-die (D2D) links, where the first die comprises a first plurality of die-to-die (D2D) nodes, where each of the first plurality of D2D nodes comprises a set of modular D2D transmit link macros, and where each of the set of modular D2D transmit link macros has a same physical shape, size, and a bandwidth capacity per transmit link macro. The multi-die system is configured to ungroup data received from a first system-on-chip (SoC) channel within the first die into a first group of data and a second group of data when a bandwidth of the first SoC channel exceeds the bandwidth capacity.

The multi-die system is further configured to ungroup data received from a second SoC channel within the first die into a third group of data and a fourth group of data when a bandwidth of the second SoC channel exceeds the bandwidth capacity. The multi-die system is further configured to, using a first D2D transmit link macro from among the set of modular D2D transmit link macros within the first die, transmit the first group of data to the second die.

The multi-die system is further configured to join the second group of data with the third group of data, and using a second D2D transmit link macro from among the set of modular D2D transmit link macros within the first die, transmit the joined data to the second die. The multi-die system is further configured to, using a third D2D transmit link macro from among the set of modular D2D transmit link macros within the first die, transmit the fourth group of data to the second die.

In yet another example, the present disclosure relates to a method for coupling a first die with a second die in a multi-die system, where the first die comprises a first plurality of die-to-die (D2D) nodes, where each of the first plurality of D2D nodes comprises a set of modular D2D transmit link macros, and where each of the set of modular D2D link transmit macros has a same physical shape, size, and a bandwidth capacity per transmit link macro. The method includes ungrouping data received from a first system-on-chip (SoC) channel within the first die into a first group of data and a second group of data when a bandwidth of the first SoC channel exceeds the bandwidth capacity per transmit link macro.

The method further includes ungrouping data received from a second SoC channel within the first die into a third group of data and a fourth group of data when a bandwidth of the second SoC channel exceeds the bandwidth capacity per transmit link macro. The method further includes, using a first D2D transmit link macro from among the set of modular D2D transmit link macros, transmitting the first group of data to the second die.

The method further includes joining the second group of data with the third group of data, and using a second D2D transmit link macro from among the set of modular D2D transmit link macros, transmitting the joined data to the second die. The method further includes, joining the second group of data with the third group of data, and using a second D2D transmit link macro from among the set of modular D2D transmit link macros, transmitting the joined data to the second die.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 21 shows a flow chart of a method for grouping and ungrouping of system busses using link macros capable of joining and splitting.

DETAILED DESCRIPTION

Examples described in this disclosure relate to ungrouping and grouping of system busses using link macros capable of joining and splitting. Certain examples further relate to ungrouping and grouping of system busses using link macros capable of joining and splitting for enabling asymmetric bandwidth. Die-to-die (D2D) links are an integral aspect of advanced packaging technologies, including packaging technologies for integrating separate dies into multi-die systems. Example topologies of multi-die systems include horizontally integrated dies (e.g., chiplets in a plane) and vertically-integrated dies (e.g., 2.5D, 3D, and silicon bridge topologies). A large monolithic chip, e.g., a system on chip (SoC), can be split into multiple smaller dies, which are often referred to as chiplets. As used herein the term "die" includes any block of material (e.g., semiconducting material or other types of materials used in manufacturing of integrated circuits on a shared substrate) having integrated circuits, where the die can be packaged. The term "dies" includes chiplets, which are typically smaller than a die.

Die-to-Die (D2D) links are used to integrate portions (located on separate chiplets/dies) of large systems, such as SoCs, into a single system. The bandwidth required from the D2D links across a die edge can be asymmetrical or symmetrical. As an example, a certain application may require more transmit bandwidth than receive bandwidth while another may require the opposite. For example, depending upon the application context, D2D links from an SoC die to an HBM stack of dies may be required to support more bandwidth for the read operations relative to the write operations, or conversely less bandwidth for the read operations relative to the write operations. Example industry standard protocols for interconnecting the dies include Universal Chiplet Interconnect Express (UCIe), Bunch Of Wires (BOW), and OCP's OpenHBI Specification (OHBI). Such standards offer the benefits that are typically associated with industry standardization but they are not flexible in terms of their use in disparate bandwidth scenarios, as noted earlier. The current standards (UCIe, BoW, OHBI) for interconnecting dies assume symmetrical interfaces with respect to bandwidth. The implementation of D2D links based on such standards invariably results in both wasted power and area for at least one of the two dies being linked. On the other hand, the use of custom implementations of D2D links to interconnect the dies for different applications also has significant downsides.

Figure 1:
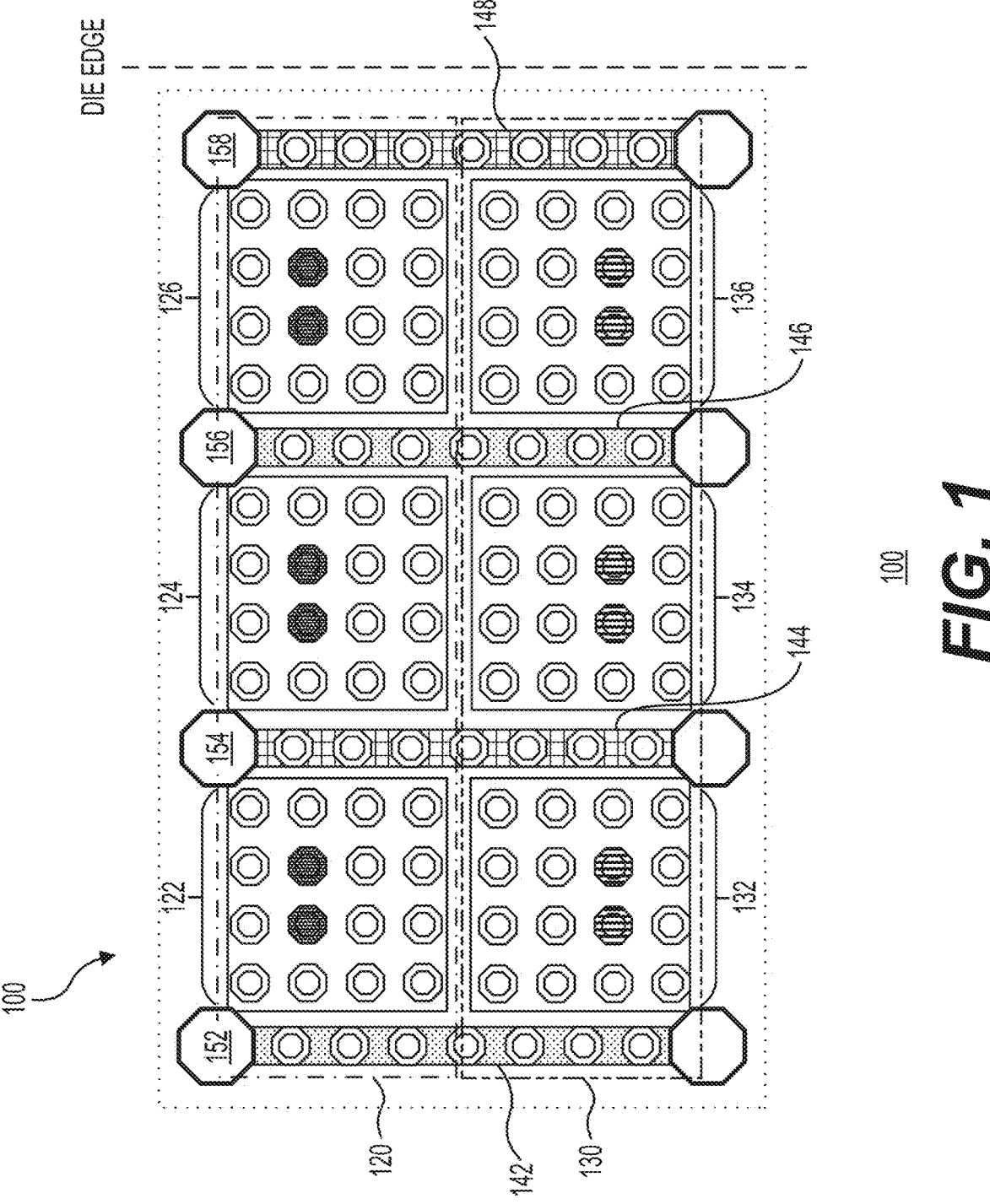
FIG. 1 shows an example die-to-die (D2D) node for ungrouping and grouping of system busses using link macros capable of joining and splitting.

FIG. 1 shows an example die-to-die (D2D) node 100 for ungrouping and grouping of system busses using link macros capable of joining and splitting. Each D2D node can be viewed as a physical aggregation of components, where each of the components further includes sub-components. The vertical dotted line shown in FIG. 1 identifies the die edge for D2D node 100. In this example, each D2D node 100 includes one or more clusters of D2D link macros. Each D2D link macro may only be a transmit link macro or a receive link macro. While one could combine transmit link macros and receive link macros in the form of clusters or another such arrangement, each D2D link macro is limited to being only one of a kind—a transmit link macro or a receive link macro. In this example, D2D node 100 is shown as including two clusters of D2D link macros. Cluster 120 includes three transmit link macros 122, 124, and 126.

Cluster 130 includes three receive link macros 132, 134, and 136. In this example, each cluster shares a clock spine, which is used to distribute clock signals to all of the D2D link macros included in a respective cluster.

With continued reference to FIG. 1, D2D node 100 includes power and ground distribution via columns of power and columns of ground. In this example, D2D node 100 includes two columns of power-power column 142 and power column 146. Moreover, in this example, D2D node includes two columns of ground-ground column 144 and ground column 148. The combination of these columns, which are arranged between the link macros, allows for efficient distribution of power within the D2D node 100. In addition, D2D node 100 includes several sacrificial (SAC) pads. Probing can be performed using these SAC pads instead of using the micro-bumps associated with the link macros. As an example, D2D node 100 is shown with several SAC pads along the periphery of the D2D node 100, including SAC pads 152, 154, 156, and 158. Although FIG. 1 shows D2D node 100 as having a certain number of clusters and D2D link macros that are arranged in a certain manner, D2D node 100 may include additional or fewer clusters and/or D2D link macros that are arranged differently.

Multiple D2D link macros can be used to communicate data from one die to another. A D2D link macro has a limited number of bits it can use for this communication due to quantization. A system bus (e.g., an SoC channel) will either need an integer number of D2D link macros or a fractional number of D2D link macros. Thus, multiple D2D link macros are needed to enable the transfer of data from an SoC channel that is wider than a D2D link macro. In those cases where the SoC channel requires an integer number of D2D link macros, then the SoC channel can use the integer number of D2D link macros for transferring data across the die edge. However, if the SoC channel needs a fractional number of D2D link macros (e.g., 1.45 D2D link macros), then a D2D link macro cane be split so that it contains the data from two or more SoC channels. On the receive side, D2D link macros can split the received data such that it can be grouped with the remaining SoC channel data. As explained further, the use of modular D2D link macros with grouping/ungrouping of SoC channels and the splitting/joining of the D2D link macros results in efficient usage of the area on a die. In addition, the use of multiple D2D link macros allows for the movement of data from a very wide bus between two dies, while also allowing for the movement of data from a very narrow bus between the dies without wasting area on the two dies. The ungrouping of the SoC channels and grouping of the SoC channels effectively results in the data being ungrouped and grouped. This grouping/ungrouping, however, is accomplished using the hardware associated with the transmit side and the receive side, including the D2D transmit link macros and the D2D receive link macros. Similarly, the joining and splitting of the D2D macros effectively results in the data being joined or split as it is traveling via the D2D transmit link macros and the receive link macros. The joining/splitting is once again accomplished using the hardware associated with the transmit side and the receive side, including the D2D transmit link macros and the D2D receive link macros. The use of hardware associated with the D2D macros allows data communication at virtually the same rate as would be the case if fully-customized transmit and receive logic were used for the die-to-die communication.

Figure 2:
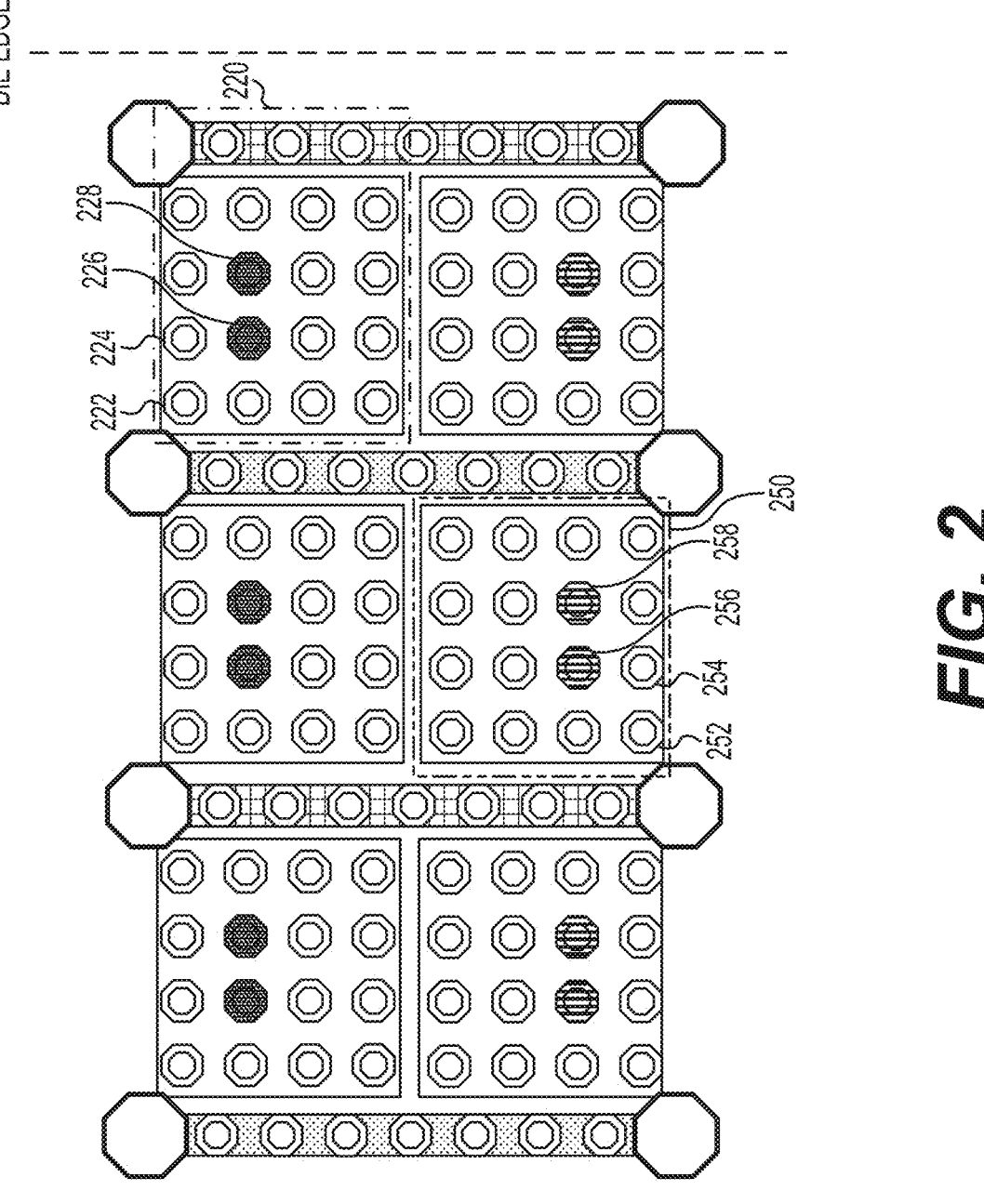
FIG. 2 shows additional details of a D2D transmit link macro and a D2D receive transmit link macro for use with the D2D node of FIG. 1.

FIG. 2 shows additional details of a D2D transmit link macro 220 and a D2D receive link macro 250 for use with the D2D node 100 of FIG. 1. To explain further modular characteristics of the D2D link macros, the details of two different types of D2D link macros (e.g., transmit v. receive) are provided. In this example, each D2D link macro has the same physical size and shape (e.g., each of the macros shown in FIG. 1 is a square-shaped macro). In addition, as explained later, each D2D link macro supports the same number of lanes, which can be used to transmit (or receive) data signals or to transmit (or receive) clock signals. Both process constraints (e.g., use of the strained silicon) and device constraints (e.g., the use of 3D devices, such as FinFETs) prevent a rotation of the D2D link macros by a 90 degree angle or any odd-multiple of the 90 degree angle. Despite these rotation constraints, the use of the modular D2D link macros allows one to offer various combinations of bandwidths and chip edge depths, as explained later.

With continued reference to FIG. 2, D2D transmit link macro 220 includes fourteen data-related bumps and two clock-related bumps. In this example, bumps 222 and 224 correspond to the data-related bumps and bumps 226 and 228 correspond to the clock-related bumps. Similarly, D2D receive link macro 250 includes further data-related bumps and two clock-related bumps. In this example, bumps 252 and 254 correspond to the data-related bumps and bumps 256 and 258 correspond to the clock-related bumps. The bumps themselves may be implemented as micro-bumps or other types of interconnection structures for use with dies. Although FIG. 2 shows D2D transmit link macro 220 and D2D receive link macro 250 as having a certain number of bumps that are arranged in a certain manner, each of these macros may include additional or fewer bumps that are arranged differently.

Figure 3:
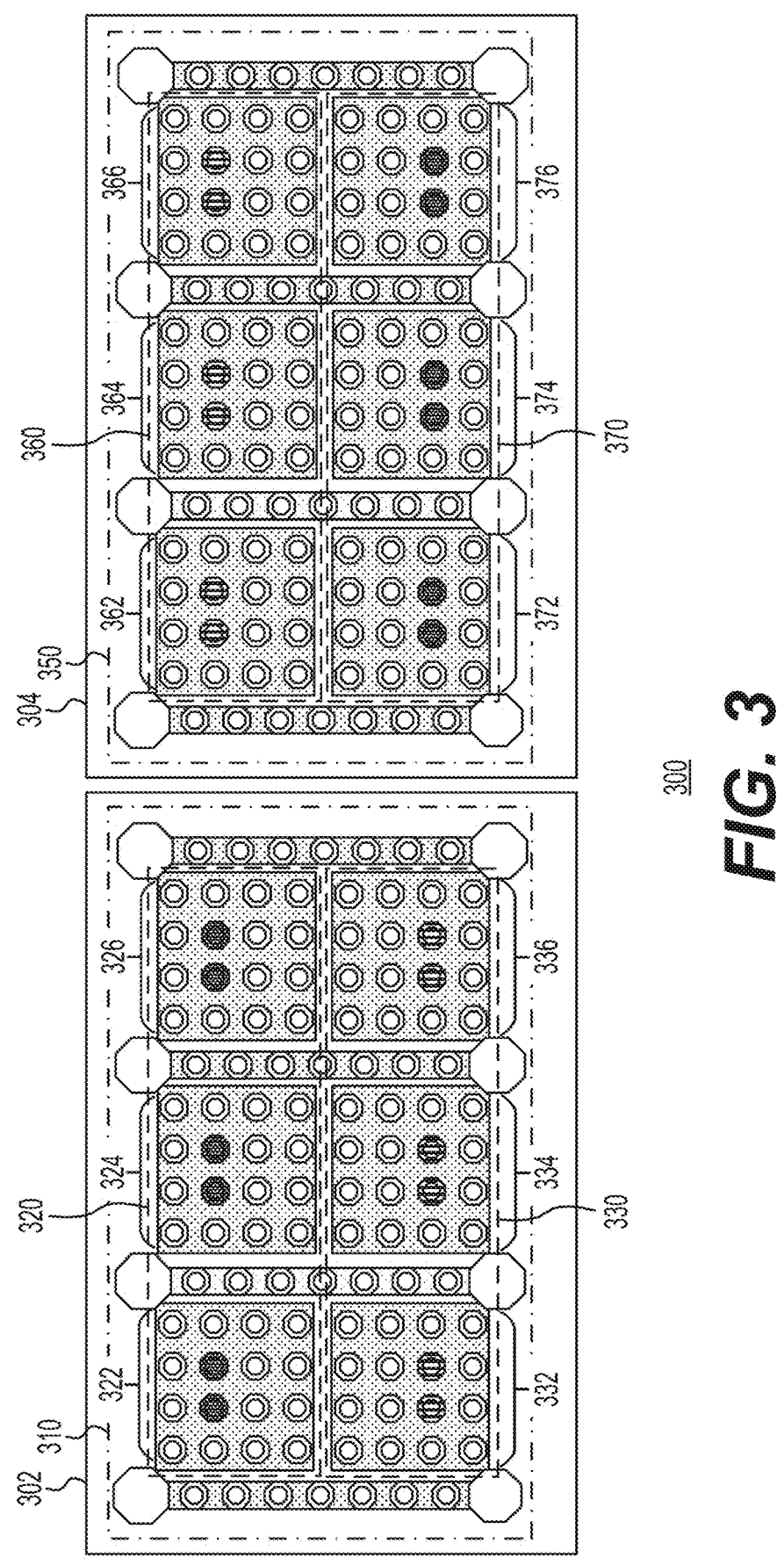
FIG. 3 shows an example multi-die system having D2D nodes including ungrouping and grouping of system busses using link macros capable of joining and splitting.

FIG. 3 shows an example multi-die system 300 having D2D nodes including ungrouping and grouping of system busses using link macros capable of joining and splitting. Multi-die system 300 includes a die 302 interconnected to another die 304 via D2D links. To explain the provision of the asymmetric bandwidth across the dies, each of the dies is shown only with D2D nodes and the other details associated with the two dies have been excluded. As an example, as part of the multi-die system 300, the D2D-links-related components are aggregated in a hierarchical fashion; thus, the die includes D2D nodes, the D2D nodes include one or more clusters, each of which, in turn, includes D2D link macros. Die 302 includes a D2D node 310 and die 304 includes a D2D node 350. D2D nodes 310 and 350 are symmetric, in that they have the same bandwidth regardless of the direction in which the data is traveling across the two nodes. D2D node 310 includes two clusters of D2D link macros-cluster 320 and cluster 330. Similarly, D2D node 350 includes two clusters of D2D links macros-cluster 360 and cluster 370. Cluster 320 includes three transmit link macros-transmit link macro 322, transmit link macro 324, and transmit link macro 326. Cluster 360, which is located across the die edge between die 302 and die 304, includes three receive link macros-receive link macro 362, receive link macro 364, and receive link macro 366. Thus, cluster 320 and cluster 360 are asymmetric in terms of the bandwidth across the die edge. This is because the data can only be transmitted from die 302 to die 304 using clusters 320 and 360; in other words, no data can be transmitted from die 304 to die 302 using clusters 320 and 360.

With continued reference to FIG. 3, cluster 330 includes three receive link macros-transmit link macro 332, receive link macro 334, and receive link macro 336. Cluster 370, which is located across the die edge between die 302 and die 304, includes three transmit link macros-transmit link macro 372, transmit link macro 374, and transmit link macro 376. Thus, cluster 330 and cluster 370 are asymmetric in terms of the bandwidth across the die edge. This is because the data can only be transmitted from die 304 to die 302 using clusters 330 and 370; in other words, no data can be transmitted from die 302 to die 304 using clusters 330 and 370. As noted earlier, while the clusters are asymmetric in this example, the D2D nodes are symmetric in terms of the bandwidth across the die edge. Although FIG. 3 shows multi-die system 300 including a certain number of D2D nodes with a certain number of modular D2D links for enabling die-to-die communication, multi-die system 300 may include more or fewer such components, which could be arranged differently from the arrangement shown in FIG. 3.

Figure 4:
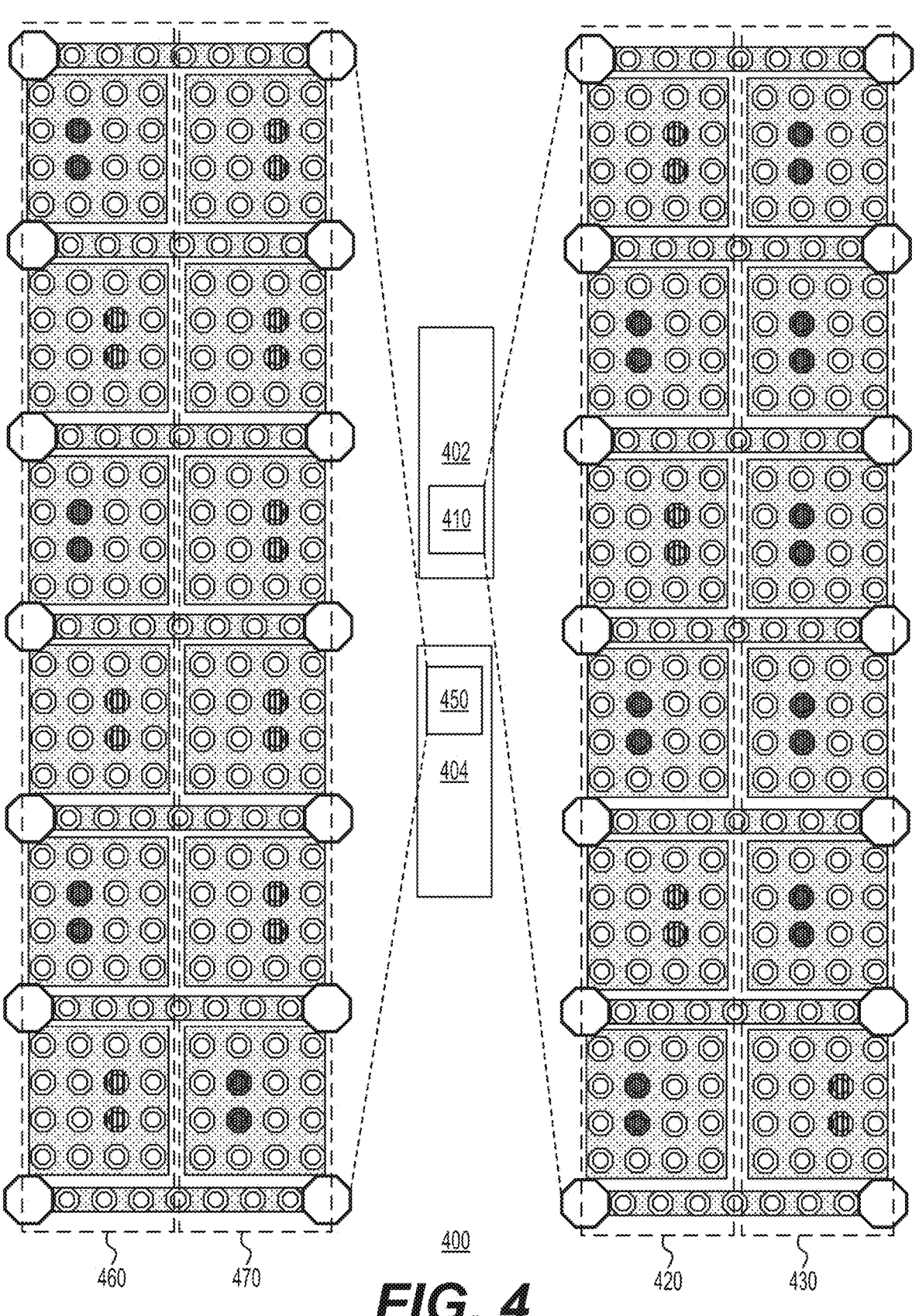
FIG. 4 shows an example multi-die system having D2D nodes with modular D2D link macros for ungrouping and grouping of system busses using link macros capable of joining and splitting.

FIG. 4 shows an example multi-die system 400 having D2D nodes with modular D2D link macros for ungrouping and grouping of system busses using link macros capable of joining and splitting. Multi-die system 400 includes a die 402 interconnected to another die 404 via D2D links. To explain the provision of the asymmetric bandwidth across the dies, each of the dies is shown only with D2D nodes and the other details associated with the two dies have been excluded. Die 402 includes a D2D node 410 and die 404 includes a D2D node 450. D2D nodes 410 and 450 are symmetric in terms of the bandwidth, in that they have the same bandwidth regardless of the direction in which the data is traveling across the two D2D nodes. D2D node 410 includes two clusters of D2D link macros-cluster 420 and cluster 430. Similarly, D2D node 450 includes two clusters of D2D links macros-cluster 460 and cluster 470. Cluster 420 of D2D node 410 includes three transmit link macros and three receive link macros; and similarly, cluster 460 of D2D node 450, which is located across the die edge between die 402 and die 404, also includes three transmit link macros and three receive link macros. However, cluster 430 of D2D node 410 includes five transmit link macros and only one receive link macro. In contrast, cluster 470 of node 450, which is located across the die edge between die 402 and die 404, includes only one transmit link macro and five receive link macros. Thus, cluster 430 and cluster 470 are asymmetric in terms of the bandwidth across the die edge. As a result, there is five times more bandwidth for data being transmitted from die 402 to die 404. This example shows that while D2D nodes can by symmetric across the die edge in terms of the bandwidth, the clusters can nevertheless be asymmetric across the die edge in terms of the bandwidth. Although FIG. 4 shows multi-die system 400 including a certain number of D2D nodes with a certain number of modular D2D links for enabling die-to-die communication, multi-die system 400 may include more or fewer such components, which could be arranged differently from the arrangement shown in FIG. 4.

Figure 5:
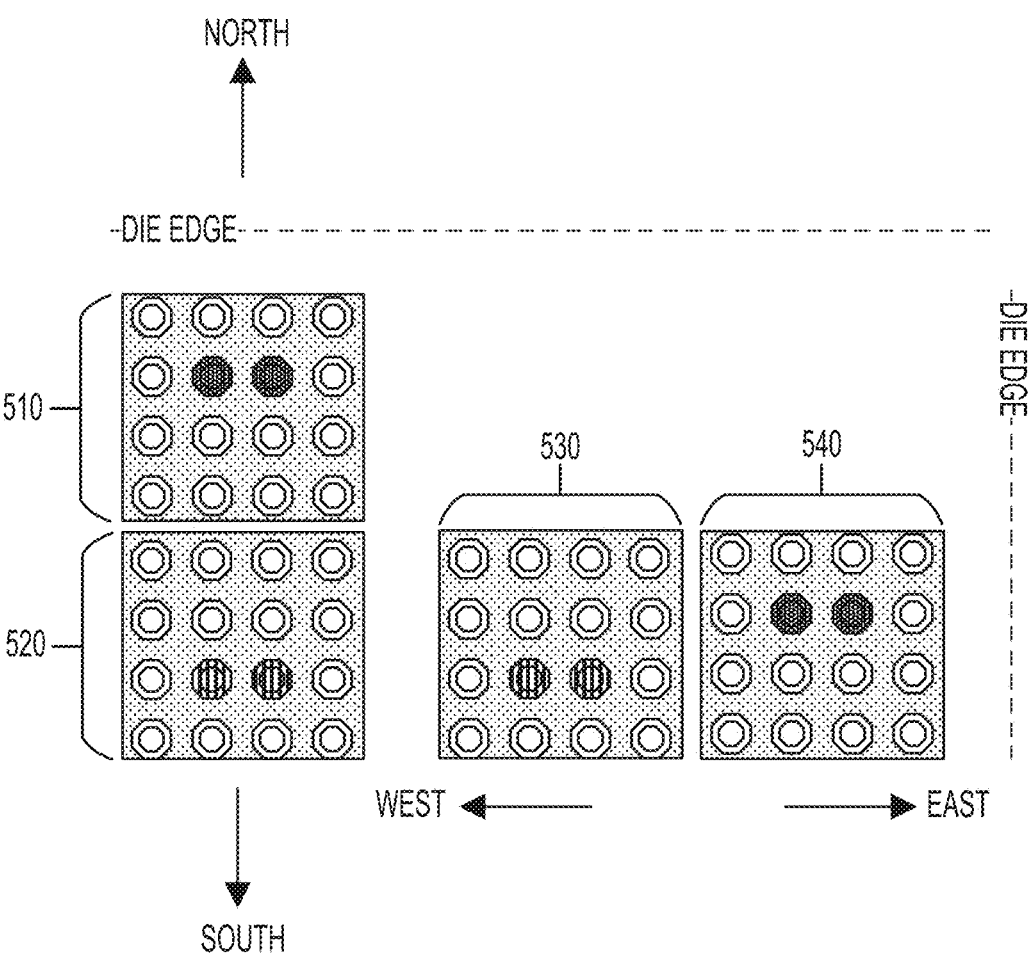
FIG. 5 illustrates the use of modular D2D link macros for enabling die-to-die communication.

FIG. 5 illustrates the use of modular D2D link macros 500 for enabling die-to-die communication. In this example, each of the D2D link macros is shown as square with the same size and the same number of data lanes. D2D transmit link macro 510 and D2D receive link macro 520 are organized as a cluster in the north/south direction. D2D receive link macro 530 and D2D transmit link macro 540 are organized as a cluster in the east/west direction. As shown in FIG. 5, the square nature of these macros allows the D2D link macros to be arranged in either of these two directions without a full re-design of the transmit and receive blocks. This is because the D2D link macros can be used in east/west or north/south configurations without complete re-design. Indeed, any reasonable configuration can be achieved by a mere shuffling of the blocks. Conventional D2D link designs may require an entirely new layout to be completed to support both the east/west and the north/south configurations. In addition, the reshuffling of the modular D2D link macros can be performed despite process constraints (e.g., the use of strained silicon during manufacturing of the dies) and device constraints (e.g., the use of 3D transistors, such as FinFETs) preventing simple rotation of these macros. Moreover, because it has only fourteen data units and one clock unit, the D2D link macro is a smaller unit than the conventional transmit/receive units (e.g., with 64 data units). The smaller unit size of the D2D link macros allows each use case to be optimized based on the requirements. The quantization efficiency of the deployment of the D2D link macros is limited by the unit size. That means even in the worst case scenario only 13 data units out of the 14 data units will be wasted. In contrast, in a 64-unit design, 63 out of the 64 data units may be wasted, resulting in much poorer quantization efficiency.

Figure 6:
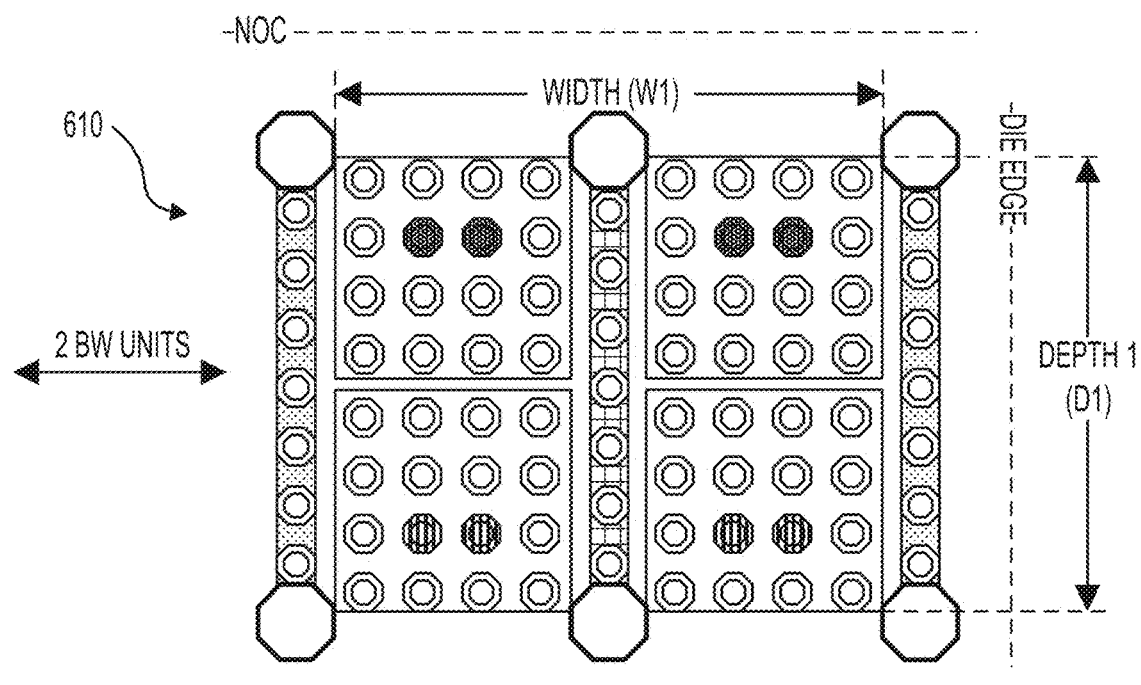
FIG. 6 shows different D2D nodes with modular D2D link macros to satisfy disparate bandwidth and die edge length requirements as part of a multi-die system.
Figure 6:
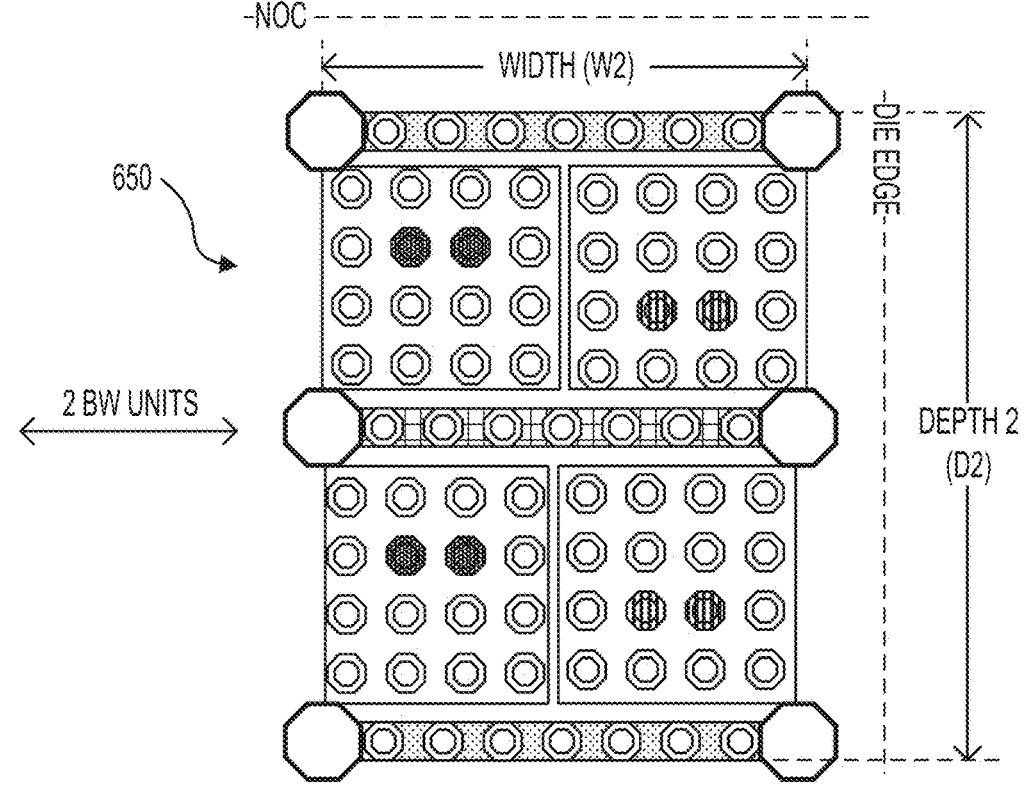

FIG. 6 shows different D2D nodes 600 with modular D2D link macros to satisfy disparate bandwidth and die edge length requirements as part of a multi-die system. As shown in FIG. 6, the power supply (e.g., the power columns and the ground columns) for the D2D nodes can be re-configured based on the SoC and packaging technology constraints. This allows the same silicon intellectual property (IP) for the D2D nodes to be used in various packaging technologies and enables another way to get optimal performance from the D2D nodes with modular D2D link macros. Indeed, as shown in FIG. 6, one can configure the D2D link macros to match nearly the exact bandwidth that the use case requires while factoring in constraints related to the chip edge depth and chip edge width. As part of FIG. 6, the depth of the respective D2D nodes along the dotted die edge is identified as the chip edge depth and the width of the D2D nodes facing a network on chip (NOC), or a similar component within the system, is identified as the width of the respective D2D nodes.

With continued reference to FIG. 6, in this example, D2D node 610 includes two clusters of D2D link macros, including two D2D transmit link macros and two D2D receive link macros. D2D node 610 has a depth of D1 along the die edge and a width of W1 facing the NOC. D2D node 610 offers two bandwidth units along the east/west direction. D2D node 650 also includes two clusters of D2D link macros, including two D2D transmit link macros and two D2D receive link macros. D2D node 650 has a depth of D2 along the die edge and a width of W2 facing the NOC. D2D node 650 also offers two bandwidth units along the east/west direction. Since D2D node 610 has a lower depth (D1) than the depth (D2) of D2D node 650, D2D node 610 offers higher bandwidth relative to the die edge depth. However, D2D node 610 has a larger width (W1) facing the NOC than the width (W2) for D2D node 650. Advantageously, because of the modularity associated with the D2D link macros, including the same shape, the same size, and bandwidth capacity, the modular D2D link macros can be deployed to achieve a good outcome for any given use case without substantial re-design of the D2D nodes.

Figure 7:
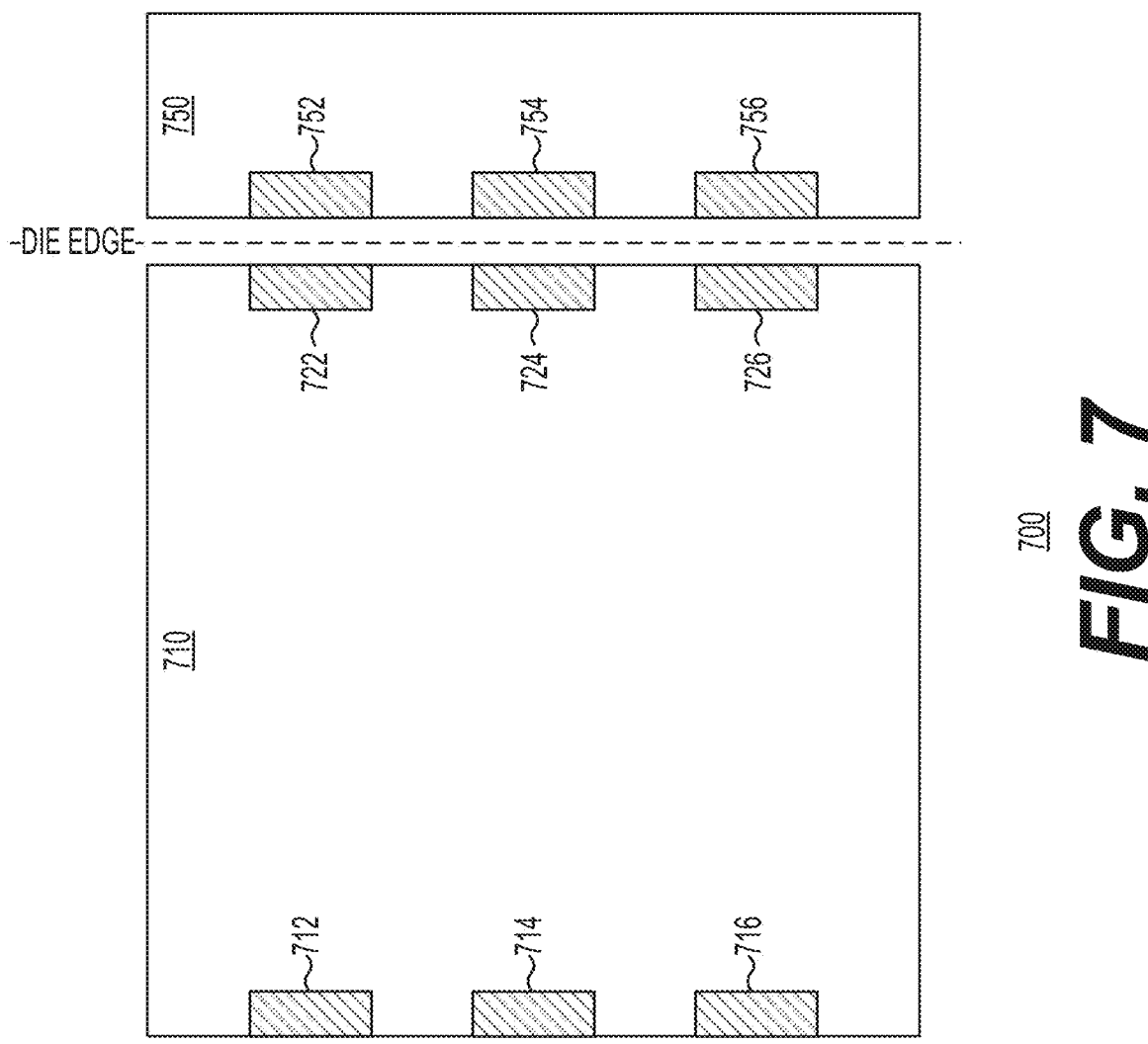
FIG. 7 is an example multi-die system with D2D nodes having modular D2D link macros for ungrouping and grouping of system busses using link macros capable of joining and splitting.

FIG. 7 is an example multi-die system 700 with D2D nodes having modular D2D link macros for ungrouping and grouping of system busses using link macros capable of joining and splitting. Multi-die system 700 includes two dies-die 710 and die 750 interconnected via D2D links. Each of die 710 and die 750 include multiple D2D nodes with modular D2D link macros. In this example, die 710 includes D2D nodes 712, 714, 716, 722, 724, and 726 and die 750 includes D2D nodes 752, 754, and 756. Depending upon the bandwidth and other requirements (e.g., the physical requirements associated with each of the dies and the multi-die system), any of the previously described D2D link macros can be included in the D2D nodes shown as part of die 710 and die 750 in FIG. 7. Although FIG. 7 shows multi-die system 700 including a certain number of D2D nodes with a certain number of modular D2D links for enabling die-to-die communication, multi-die system 700 may include more or fewer such components, which could be arranged differently from the arrangement shown in FIG. 7.

Figure 8:
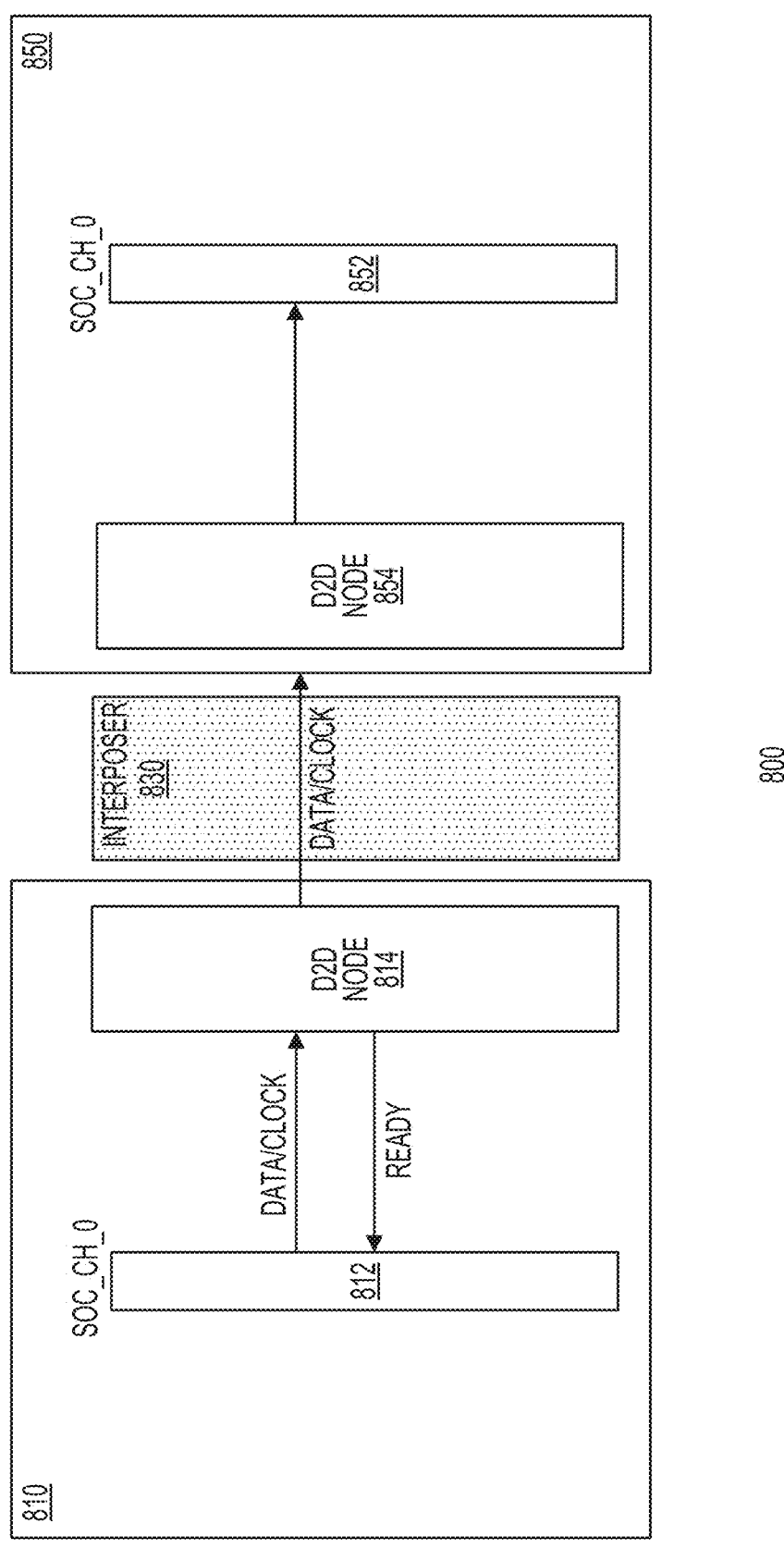
FIG. 8 shows a block diagram of an example multi-die system having modular D2D link macros for ungrouping and grouping of system busses using link macros capable of joining and splitting.

FIG. 8 shows a block diagram of an example multi-die system 800 having modular D2D link macros for ungrouping and grouping of system busses using link macros capable of joining and splitting. The block diagram for multi-die system 800 shown in FIG. 8 illustrates the logical aspects of the use of the modular D2D link macros in the context of multi-die systems, such as the multi-die system 800. Multi-die system 800 includes a die 810 coupled with another die 850 using an interposer 830. To illustrate the use of modular D2D link macros, only certain aspects of each die are highlighted. Die 810 includes D2D node 814 and die 850 includes D2D node 854. The purpose of each of the D2D nodes (having modular D2D link macros) is to transport the contents of a bus included within one die to another bus included in another die. Die 810 includes a system-on-chip (SoC) channel 812 (SOC_CH_0), which is coupled to D2D node 814, located within die 810. SoC channel 812 can provide data, clock, and valid signals to D2D node 814. D2D node 814 can transmit the data along with a clock signal to D2D node 854 located within die 850 via interposer 830. The SoC channel 812 can receive control signals (e.g., READY) from D2D node 814.

With continued reference to FIG. 8, die 850 includes an SoC channel 852 (also labeled as SOC_CH_0), which can be used to receive data and clock signals from D2D node 854, which is also located within die 850. For ease of explanation, in this example, the busses on the two dies are shown as identical in terms of their bandwidth (e.g., 390 bits). The principal function of the D2D nodes and the D2D links is to transport data from one die to the other die. Any number of SoC channels from die 810 can be transported across the die edge to the interposer 830 and then from the interposer to die 850. As explained earlier, in physical terms, each D2D node can include clusters of D2D link macros that can be transmit link macros or receive link macros. Although FIG. 8 shows multi-die system 800 including a certain number of D2D nodes for enabling die-to-die communication, multi-die system 800 may include more or fewer such components, which could be arranged differently from the arrangement shown in FIG. 8.

Figure 9:
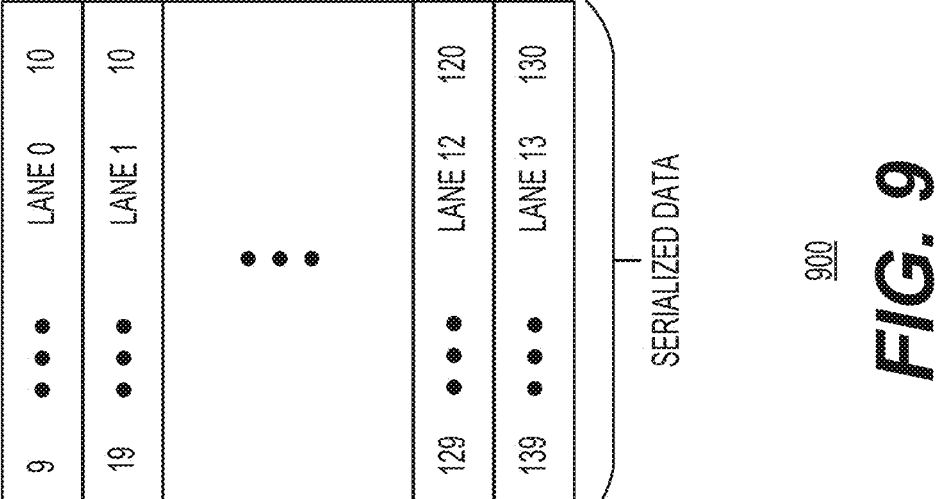
FIG. 9 is an example modular D2D transmit link macro for ungrouping and grouping of system busses.

FIG. 9 is an example modular D2D transmit link macro 900 for ungrouping and grouping of system busses. As explained earlier, the physical D2D links between the two dies are implemented using a certain number of lanes per D2D link macro and serialization of the data across the D2D links. In this example, the modular D2D transmit link macro 900 is capable of handling 10 bits per lane, which are then sent as serialized data across the physical D2D link, resulting in a serialization of 10:1. Example modular D2D transmit link macro 900 is shown with fourteen lanes (LANE 0, LANE 1, . . . . LANE 12, and LANE 13). Although FIG. 9 shows the modular D2D transmit link macro 900 as having a certain number of lanes with a certain number of bits per lane, the modular D2D transmit link macro 900 could have additional or fewer lanes with a different number of bits per lane.

Figure 10:
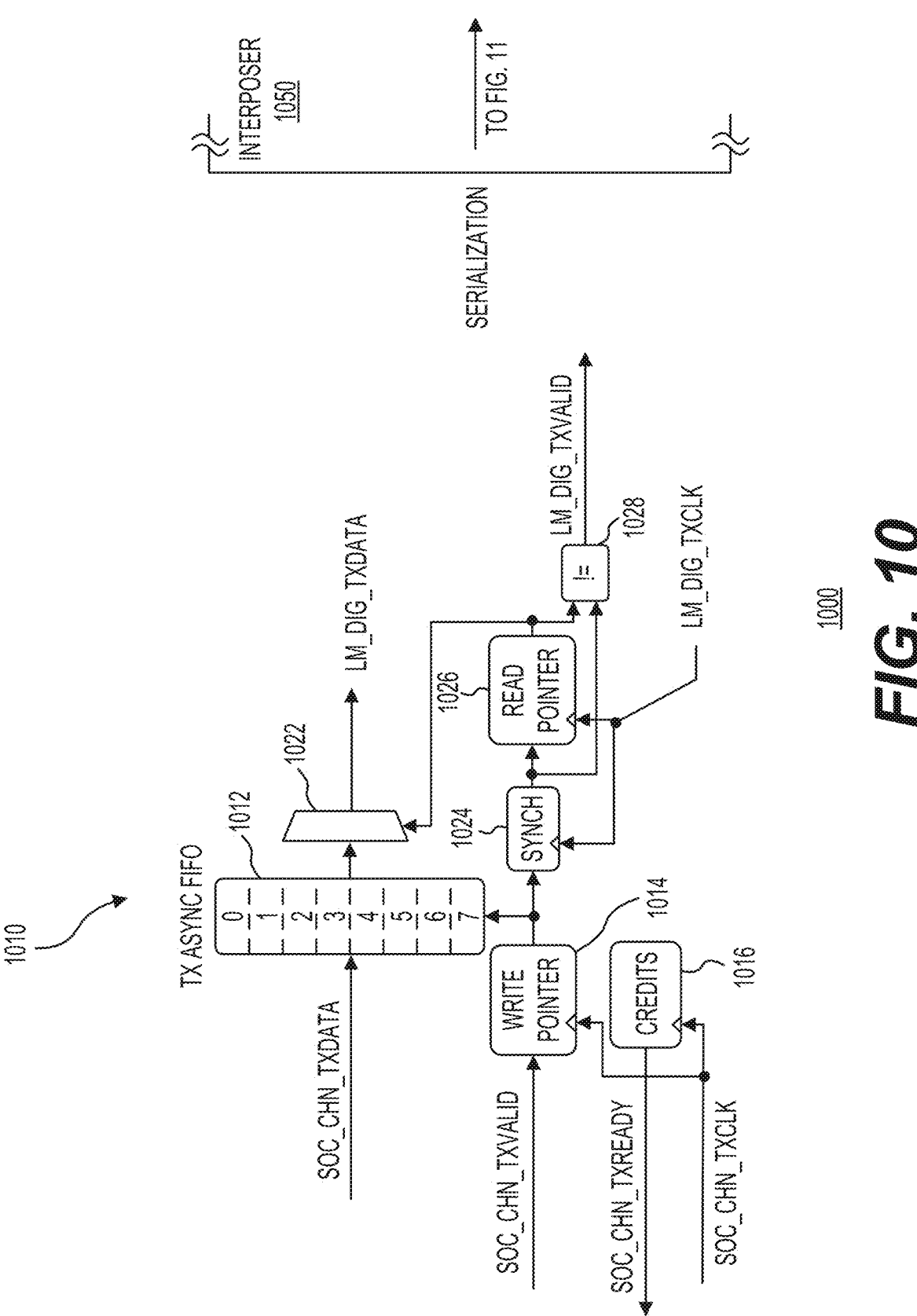
FIG. 10 shows a block diagram of a transmit side of a D2D transmit link macro for ungrouping and grouping of system busses.
Figure 11:
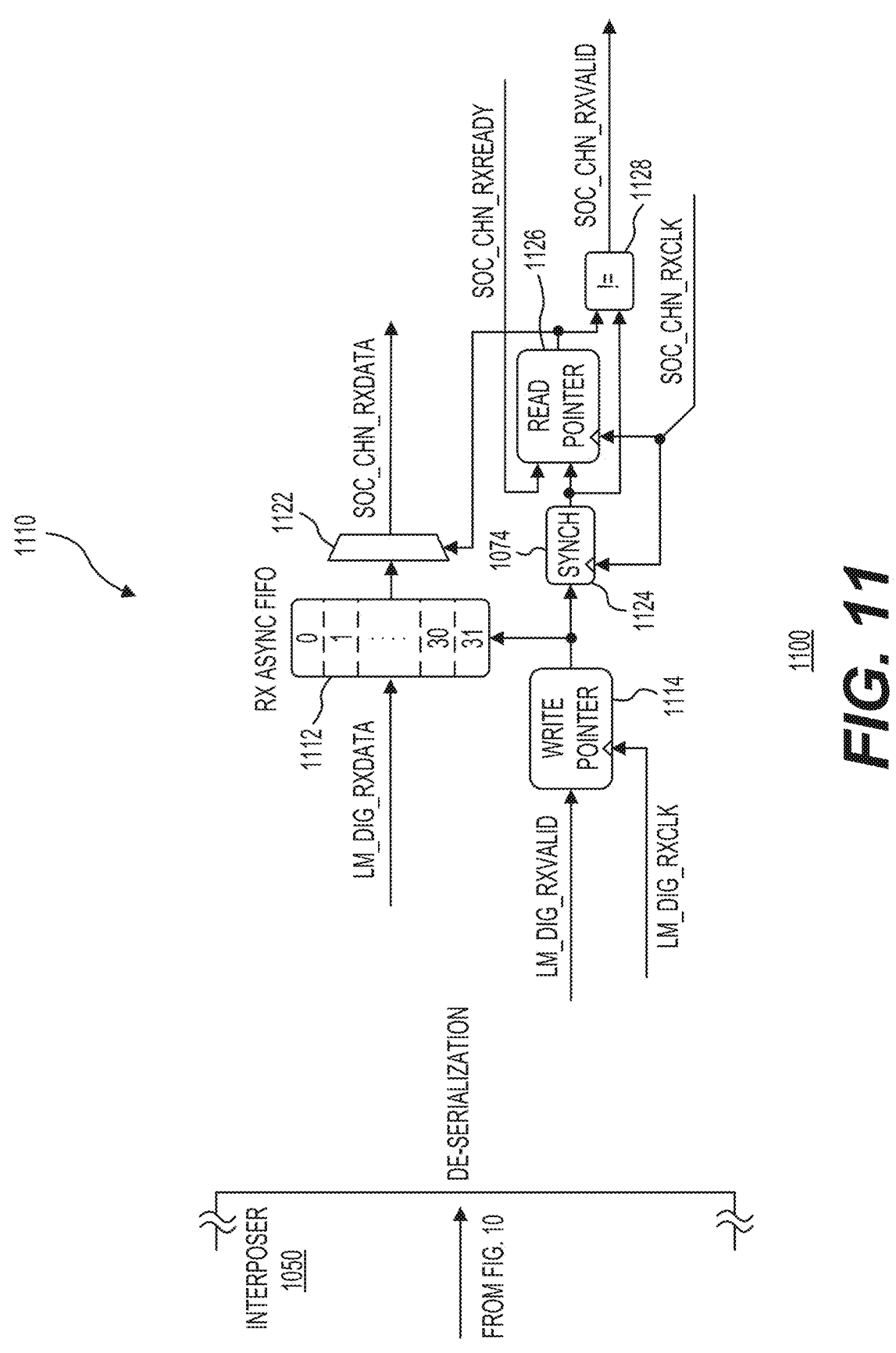
FIG. 11 shows a block diagram of a receive side of a D2D transmit link macro for ungrouping and grouping of system busses.

FIG. 10 shows a block diagram of a transmit side 1000 of a D2D transmit link macro 1010 for ungrouping and grouping of system busses. FIG. 11 shows a block diagram of a receive side 1100 of a D2D receive link macro 1110 for enabling asymmetric bandwidth across the same two dies. In this example, it is assumed that there is perfect alignment in terms of the bandwidth of the pertinent SoC channel and the bandwidth offered by the D2D transmit link macro. As an example, D2D transmit link macro 1010 could be implemented as the D2D transmit link macro 900 of FIG. 9, which offers a capacity of 10-bits per lane and has 14 data lanes. In a similar vein, this example assumes that the D2D receive link macro also has a perfect alignment in terms of the bandwidth offered by the D2D transmit link macro and the bandwidth of the SoC channel. In this example, D2D transmit link macro 1010 is configured to process an SoC channel with a bandwidth of a certain number of bits (e.g., 140 bits) and provide those for serialization. The serialized data is then transmitted via an interposer 1050 to the receive side (shown in FIG. 11). The data output by the D2D link macro 1010 is serialized prior to the transmission using a serializer block (not shown). Table 1 below provides a brief explanation for the various signals (shown in FIG. 10) associated with the D2D transmit link macro 1010.

TABLE 1

| D2D Transmit Link Marco Signals | Brief Explanation |
|---|---|
| SOC_CHN_TXDATA | Data for transmission from the pertinent SoC channel to the D2D transmit link macro. |
| SOC_CHN_TXVALID | Control signal for the write pointer from the pertinent SoC channel indicating valid transmit data. |
| SOC_CHN_TXCLK | Transmit clock associated with the pertinent SoC channel. |
| SOC_CHN_TXREADY | Ready signal from the D2D transmit link macro to the SoC channel. |
| LM_DIG_TXDATA | Data for transmission from the D2D transmit link macro, which is serialized, and then transmitted to another die. |
| LM_DIG_TXCLK | Transmit clock associated with the D2D transmit link macro. |
| LM_DIG_TXVALID | Control signal indicative of whether the transmit data is valid. |

With continued reference to FIG. 10, in this example, the D2D transmit link macro 1010 includes a transmit asynchronous FIFO (TX ASYNC FIFO 1012), which is used to receive the data to be transmitted (e.g., SOC_CHN_TX-DATA of table 1). The D2D transmit link macro 1010 further includes a write pointer 1014, a block for managing flow using credits (e.g., CREDITS 1016), a synchronization channel block (e.g., SYNCH 1024), and a read pointer 1026. The write pointer 1014 points to the data in the TX ASYNC FIFO 1012 and it advances through the FIFO once the write pointer 1014 receives a valid signal (e.g., SOC_CHN_TXVALID of table 1). The write pointer 1014 is synchronized with the read pointer 1026 using the synchronization channel block (e.g., SYNCH 1024). As shown in FIG. 10, both the synchronization channel block and the read pointer 1026 are synchronized using a transmit link macro clock signal (e.g., LM_DIG_TXCLK of table 1). This allows the read pointer 1026 to follow the write pointer 1014 with a certain delay in between. The read pointer 1026 outputs a signal that is used to control the output of multiplexer 1022, which receives the data to be transmitted from the TX ASYNC FIFO 1012. A logic block 1028 that implements the !=equality is provided the output of both the read pointer 1026 and the synchronization channel block (e.g., SYNCH 1024). Logic block 1028 processes the two input signals and generates a control signal (e.g., LM_DIG_TXVALID of table 1) indicating whether the data to be transmitted is valid. Although FIG. 10 shows D2D transmit link macro 1010 as including certain components arranged in a certain manner, D2D transmit link macro 1010 could include additional or fewer components that are arranged differently.

FIG. 11 shows a block diagram of a receive side 1100 of a D2D receive link macro 1110 for ungrouping and grouping of system busses. On the receive side 1100, the serialized data, received via interposer 1050, is de-serialized using a de-serializer block (not shown). The de-serialized data is then processed by the D2D receive link macro 1110. As an example, if the transmit side sent 140 bits after serialization then the D2D receive link macro 1110 processes those bits. Table 2 below provides a brief explanation for the various signals (shown in FIG. 11) associated with the D2D receive link macro 1110.

TABLE 2

| D2D Receive Link Marco Signals | Brief Explanation |
| --- | --- |
| LM_DIG_RXDATA | Data, which has been de-serialized, received from another die by the D2D receive link macro. |
| LM_DIG_RXCLK | Receive clock associated with the D2D receive link macro. |
| LM_DIG_RXVALID | Control signal indicative of whether the receive data is valid. |
| SOC_CHN_RXDATA | Data provided by the D2D receive link to the pertinent SoC channel. |
| SOC_CHN_RXVALID | Control signal for the SoC channel indicating valid receive data. |
| SOC_CHN_RXCLK | Receive clock associated with the pertinent SoC channel. |
| SOC_CHN_RXREADY | Ready signal from the pertinent SoC channel to D2D receive link macro. |

With continued reference to FIG. 11, in this example, the D2D receive link macro 1110 includes a receive asynchronous FIFO (RX ASYNC FIFO 1112), which is used to receive the de-serialized data (e.g., LM_DIG_TXDATA of table 2). The D2D receive link macro 1110 further includes a write pointer 1114, a synchronization channel block (e.g., SYNCH 1124), and a read pointer 1126. The write pointer 1114 points to the data in the RX ASYNC FIFO 1112 and it is synchronized with the read pointer 1126 using the synchronization channel block (e.g., SYNCH 1124). As shown in FIG. 11, both the synchronization channel block and the read pointer 1126 are synchronized using a SoC channel receive clock signal (e.g., SOC_CHN_RXCLK of table 2). The read pointer 1126 outputs a signal that is used to control the output of multiplexer 1122, which receives the data from the RX ASYNC FIFO 1112 and outputs the received data to the respective SoC channel (e.g., as SOC_CHN_RXDATA of table 2). In terms of reading the data, the read side of the RX ASYNC FIFO 1112 waits for all of the pointers to advance to the same value before reading out the location of the RX ASYNC FIFO 1112. A logic block 1128 that implements the !=equality is provided the output of both the read pointer 1126 and the synchronization channel block (e.g., SYNCH 1124). Logic block 1128 processes the two input signals and generates a control signal (e.g., SOC- _CHN_RXVALID of table 2) indicating whether the data for the respective SoC channel is valid. Although FIG. 11 shows D2D receive link macro 1110 as including certain components arranged in a certain manner, D2D receive link macro 1110 could include additional or fewer components that are arranged differently.

Figure 12:
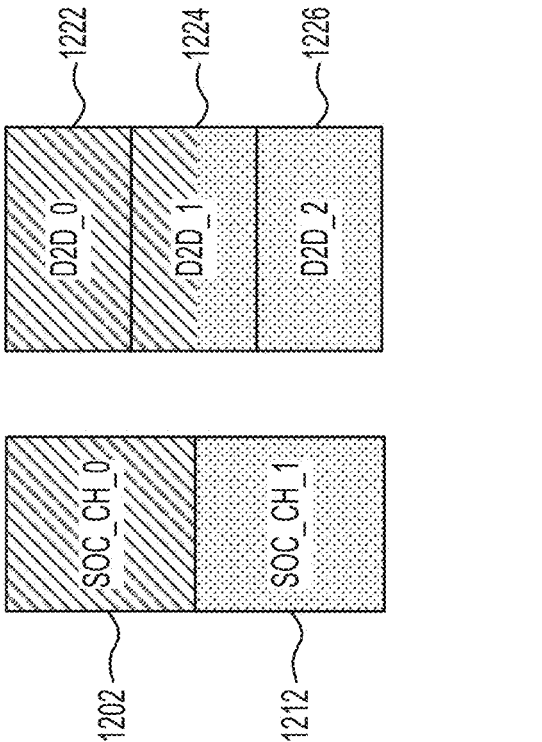
FIG. 12 shows an example transmit data path including SoC channels coupled with modular D2D transmit link macros for ungrouping and grouping of SoC channels.
Figure 13:
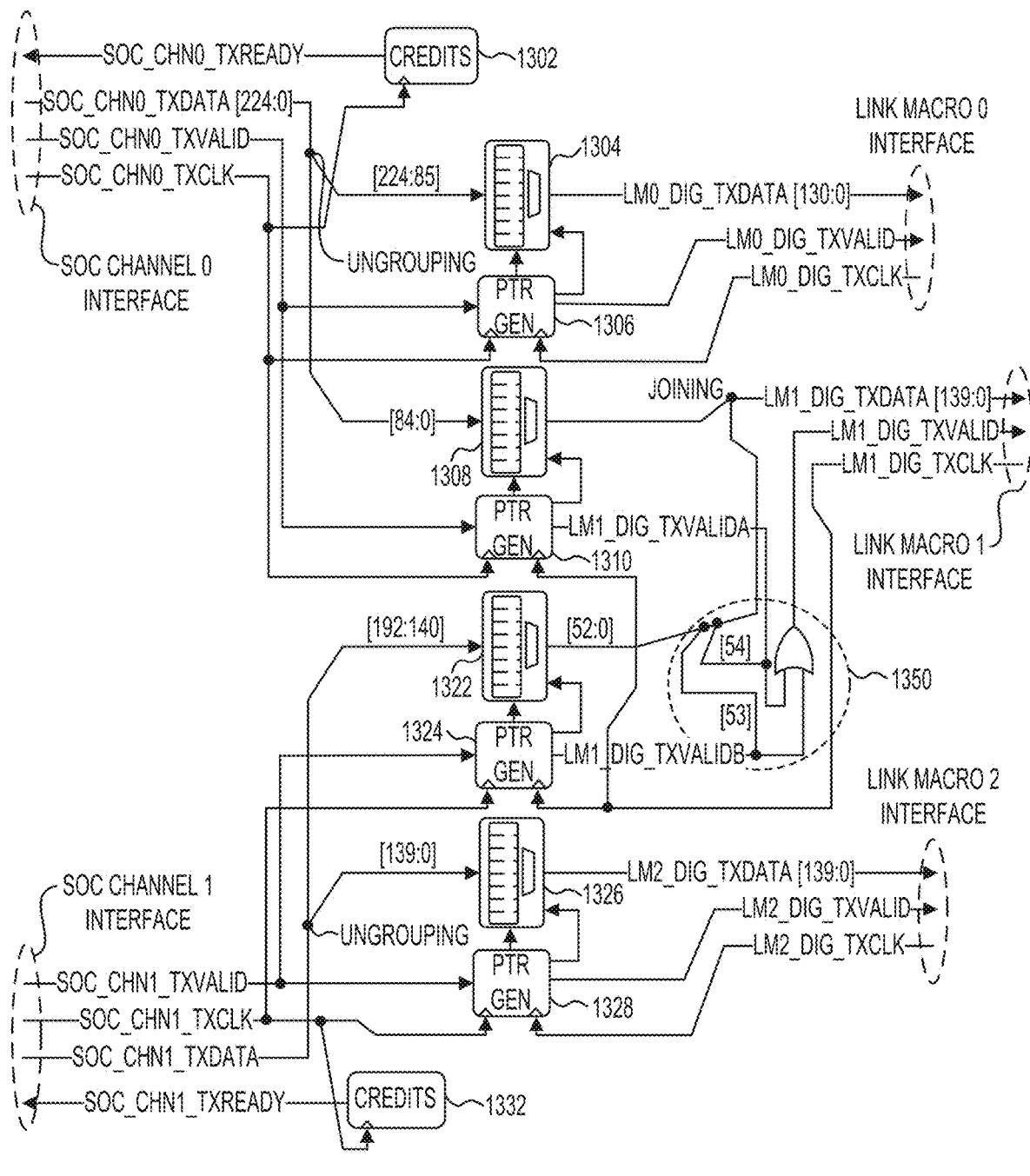
FIG. 13 shows an example set of D2D transmit link macros for use with ungrouping and grouping of system busses.
Figure 14:
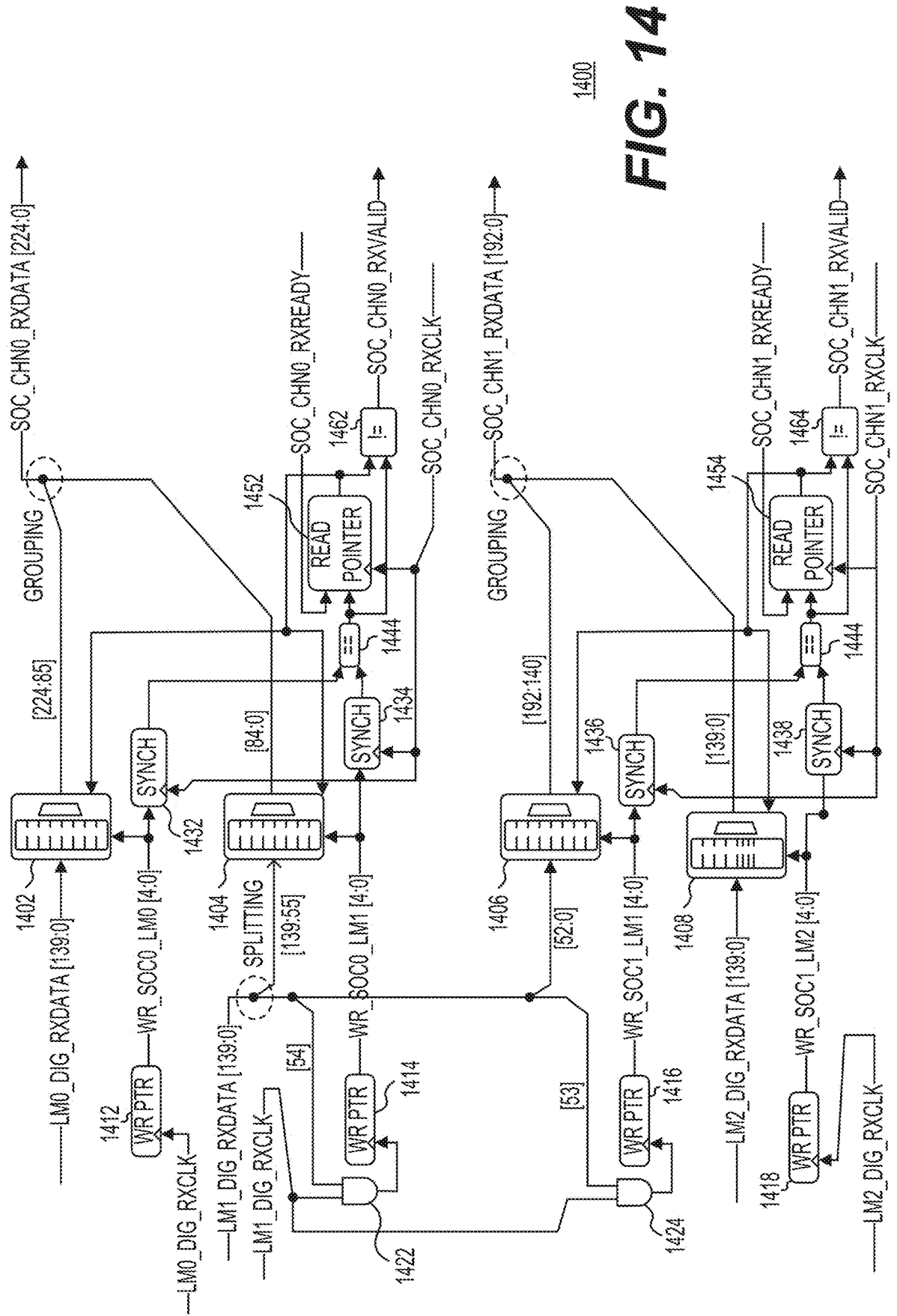
FIG. 14 shows an example set of D2D receive link macros for use with the set of D2D transmit link macros of FIG. 13.

While the transmit side and the receive side described with respect to FIGS. 10 and 11 relate to a perfect alignment in terms of the bandwidth of the SoC channel and the bandwidth offered by the D2D link macros, in many instances this is not the case. As an example, a specific SoC channel having a bandwidth that exceeds the bandwidth of a single D2D transmit link macro can be ungrouped for transport across joined D2D transmit link macros. At the receive side, the ungrouped SoC channel can be grouped using split D2D receive link macros. FIG. 12 shows an example of a transmit data path that includes such asymmetry. FIGS. 13 and 14 provide an example of the transmit side and the receive side, respectively, for accomplishing grouping, ungrouping, joining, and splitting.

FIG. 12 shows an example transmit data path 1200 including SoC channels coupled with modular D2D transmit link macros for ungrouping and grouping of SoC channels. Transmit data path 1200 includes two SoC channels: SOC_CH_0 1202 and SOC_CH_1212. This example assumes that SOC_CH_0 1202 has a bandwidth of 225 bits in terms of the data that requires transmission and that SOC_CH_1 1212 has a bandwidth of 193 bits in terms of the data thar requires transmission. In this example, the transmit data path includes three modular D2D transmit link macros: D2D_0 1222, D2D_1 1224, and D2D_2 1226. This example further assumes that each of the modular D2D transmit link macros has the same physical shape, the same size, and the same bandwidth capacity. In this example, each of the modular D2D transmit link macros has 14 data lanes, where each lane is capable of handling 10 bits (e.g., similar to modular D2D transmit link macro 900 of FIG. 9), resulting in the bandwidth capacity of 140 bits. Notably, in this example, each of the SoC channels has a bandwidth that exceeds the bandwidth capacity of the modular D2D transmit link macro. To allow for transmission of data, the data from the first SoC channel (e.g., SOC_CH_0 1202) is ungrouped into a first group of data and a second group of data. Similarly, the data from the second SoC channel (SOC_CH_1 1212) is ungrouped into a third group of data and a fourth group of data. In this example, a first modular D2D transmit link macro (e.g., D2D_0 1222) is configured to transmit the first group of data, a second modular D2D transmit link macro (e.g., D2D_1 1224) is configured to transmit both the second group of data and the third group of data, and a third modular D2D transmit link macro (e.g., D2D_2 1226) is configured to transmit the fourth group of data.

FIG. 13 shows an example set of D2D transmit link macros 1300 for use with ungrouping and grouping of system busses. The set of D2D transmit link macros 1300 can be used to receive data from one or more SoC channels and transfer the data via D2D links. As described earlier, the D2D transmit link macros can process the data received from the SoC channels, and after serialization, the data can be transmitted via D2D links to another die via an interposer or similar structure. In this example, the set of D2D transmit link macros 1300 assumes a lack of perfect alignment in terms of the bandwidth of the pertinent SoC channel and the bandwidth offered by the D2D transmit link macro. As an example, D2D transmit link macros 1300 can be implemented with similar components as described earlier with respect to D2D transmit link macro 1010 of FIG. 10 with additional logic for ungrouping and joining. In this example, the set of D2D transmit link macros is configured to implement the transmit data path shown with respect to FIG. 12. In terms of ungrouping, as an example a specific SoC channel having a bandwidth that exceeds the bandwidth of a single D2D transmit link macro can be ungrouped for transport across joined D2D transmit link macros. At the receive side, the ungrouped SoC channel can be grouped using split D2D receive link macros. In this example, to enable grouping and ungrouping, all of the FIFOs at both the transmit side and the receive side are initialized at the same time when the D2D nodes are initialized upon the SoC powering up.

With continued reference to FIG. 13, in this example, the set of D2D transmit link macro is configured to transmit data from two SoC channels: SOC_CH_0 1202 and SOC_CH_1 1212 (shown as part of transmit data path 1200 of FIG. 12). This example assumes that SOC_CH_0 1202 has a bandwidth of 225 bits in terms of the data that requires transmission and that SOC_CH_1 1212 has a bandwidth of 193 bits in terms of the data that requires transmission. In this example, the set of D2D transmit link macros 1300 includes three modular D2D transmit link macros. This example further assumes that each of the modular D2D transmit link macros has the same physical shape, the same size, and the same bandwidth capacity. In this example, each of the set of D2D transmit link macros 1300 supports 14 data lanes, where each lane is capable of handling 10 bits (e.g., similar to modular D2D transmit link macro 900 of FIG. 9), resulting in the bandwidth capacity of 140 bits. Notably, in this example, each of the SoC channels has a bandwidth that exceeds the bandwidth capacity of the modular D2D transmit link macro. To allow for transmission of data, the data from the first SoC channel (e.g., SOC_CH_0 1202) is ungrouped into a first group of data and a second group of data. Similarly, the data from the second SoC channel (SOC_CH_1 1212) is ungrouped into a third group of data and a fourth group of data. In this example, a first modular D2D transmit link macro (e.g., a D2D transmit link macro corresponding to D2D_0 1222 of FIG. 12) is configured to transmit the first group of data, a second modular D2D transmit link macro (.g., a D2D transmit link macro corresponding to D2D_1 1224 of FIG. 12) is configured to transmit both the second group of data and the third group of data, and a third modular D2D transmit link macro (.g., a D2D transmit link macro corresponding to D2D_2 1226 of FIG. 12) is configured to transmit the fourth group of data.

Still referring to FIG. 13, the data output by each of the set of D2D transmit link macros 1300 is serialized prior to the transmission using a serializer block (not shown). Similar signals as described earlier with respect to table 1 in the context of FIG. 10 are associated with the set of D2D transmit link macros 1300. In this example, each set of D2D transmit link macro 1300 includes some of the same circuitry as described earlier with respect to D2D transmit link macro 1010. As an example, the set of D2D transmit link macros 1300 include circuitry for flow control, such as credits 1302 and credits 1332. The set of D2D transmit link macros 1300 further includes circuitry associated with FIFOs (e.g., FIFO blocks 1304, 1308, 1322, and 1326) and pointer generation (e.g., pointer generation blocks 1306, 1310, 1324, and 1328). Each of the FIFOs included in FIFO blocks 1304, 1308, 1322, and 1328 waits for all the associated pointers to advance to the same value before reading out the location of the FIFO. The set of transmit link macros 1300 further includes control logic 1350 for generating signals that permit joining of data for transmission by a shared D2D transmit link macro. A valid signal is inserted into the data path for each SoC bus that is ungrouped. As shown in FIG. 13, bits 53 and 54 carry the valid signal for the two SoC channels that were ungrouped. Using control logic 1350, these bits are processed to validate the data and generate the LM1_DIG_TXVALID signal for transmission to the receive side. Although FIG. 13 shows the set of D2D transmit link macros 1300 as having a certain number of components that are arranged in a certain manner, the D2D transmit link macros 1300 may include additional or fewer components that are arranged differently. As an example, although in FIG. 13, a clock signal is used as the valid signal for the top transmit link macro shown as part of the set of D2D transmit link macros 1300, the clock signal may not be used for this purpose. Instead, another valid signal will need to be inserted into the data for that D2D transmit link macro to qualify the data as it goes through the transmit data path.

FIG. 14 shows an example set of D2D receive link macros 1400 for use with the set of D2D transmit link macros 1300 of FIG. 13. The set of D2D receive link macros 1400 can be used to receive data via the D2D links. As described earlier, the D2D receive link macros can process the data received from D2D links, and after de-serialization, the data can be transferred to the SoC channels within the SoC (or a similar system). As an example, each of the set of D2D receive link macros 1400 can be implemented with similar components as described earlier with respect to D2D receive link macro 1110 of FIG. 11 with the additional logic for splitting and grouping. In this example, the set of D2D receive link macros 1400 includes three modular D2D receive link macros. This example further assumes that each of the modular D2D receive link macros has the same physical shape, the same size, and the same bandwidth capacity. In this example, each of the set of D2D receive link macros 1400 supports 14 data lanes, where each lane is capable of handling 10 bits, resulting in a bandwidth capacity of 140 bits. The first group of data corresponding to SoC channel 0 is received via one of the set of D2D receive link macros 1400. The second group of data (corresponding to SoC channel 0), which was ungrouped at the transmit side, is received by one of the second set of D2D receive link macros 1400. The third group of data (corresponding to SoC channel 1) is received via the one of the second set of D2D receive link macros, and the fourth group of data (corresponding to SoC channel 1) is received by one of the third set of D2D receive link macros 1400.

With continued reference to FIG. 14, similar signals as described earlier with respect to table 2 in the context of FIG. 11 are associated with the set of D2D receive link macros 1400. In this example, each set of D2D receive link macro 1400 includes some of the same circuitry as described earlier with respect to D2D receive link macros 1110 of FIG. 11. As an example, the set of D2D receive link macros 1400 includes circuitry associated with FIFOs (e.g., FIFO blocks 1402, 1404, 1406, and 1408) and write pointer generation circuitry (e.g., WR PTR blocks 1412, 1414, 1416, and 1418). The set of D2D receive link macros 1400 further includes control logic (e.g., AND gates 1422 and 1424) for generating signals that are used for splitting of the data for processing by a shared D2D receive link macro. The set of D2D receive link macros 1400 further includes synchronization channel blocks (e.g., SYNCH 1432, SYNCH 1434, SYNCH 1436, and SYNCH 1438), and read pointers (e.g., READ POINTER 1452 and READ POINTER 1454). As explained earlier with respect to FIG. 11, each respective write pointer points to the data in the respective receive FIFO and it is synchronized with the respective read pointer using the respective synchronization channel block. In terms of reading the data, as described earlier with respect to FIG. 11, the read side waits for all of the pointers to advance to the same value before reading out the location of the receive FIFO. To allow for the grouping of the data received from different SoC channels, logic blocks 1442 and 1444 that implement the equality operation are used at the input of the respective read pointer. Additional logic blocks 1462 and 1464 that implement the != equality are provided the output of both the respective read pointer and the respective logic blocks 1442 and 1444. Although FIG. 14 shows the set of D2D receive link macros 1400 as having a certain number of components that are arranged in a certain manner, the set of D2D receive link macros 1400 may include additional or fewer components that are arranged differently.

Figure 15:
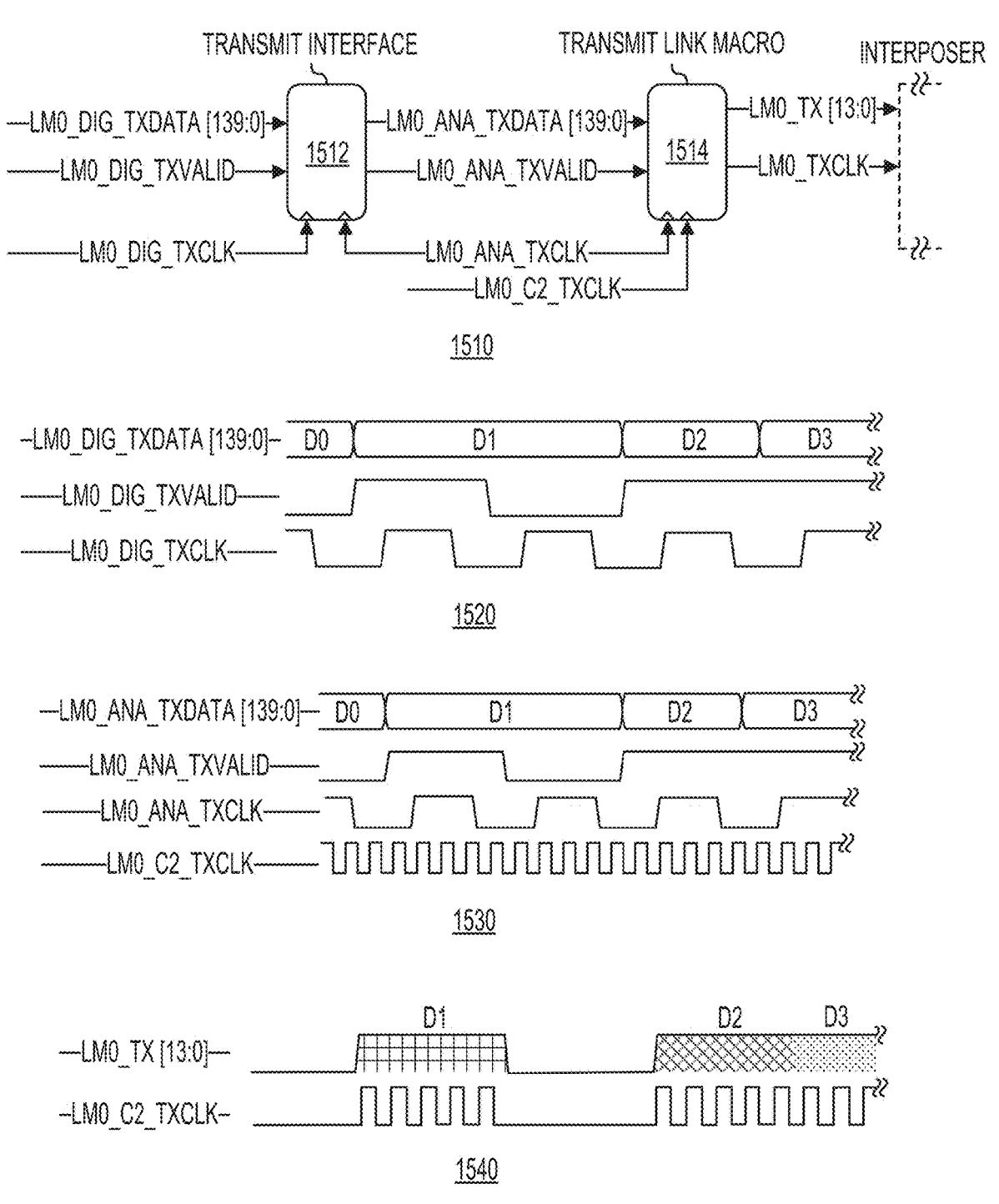
FIG. 15 shows wave diagrams associated with the set of D2D transmit link macros of FIG. 13.

FIG. 15 shows wave diagrams 1520, 1530, and 1540 associated with the set of D2D transmit link macros of FIG. 13. Wave diagrams 1520, 1530, and 1540 are used to illustrate the data flow along with related signals, including clock signals. In order to explain the data flow, a simplified transmit side 1510 is shown with a transmit interface 1512 and a transmit link macro 1514, which is referred to as LM0 as part of the signals shown in the wave diagrams. Transmit side 1510 includes link macros that can handle 140 bits as per the fourteen 10-bit lanes. Wave diagrams 1520 correspond to the data signals received by the transmit interface 1512 from an SoC channel interface and a transmit clock signal. These signals include: LM0_DIG_TXDATA [139:0], LM0_DIG_TXVALID, and LM0_DIG_TXCLK. Wave diagrams 1530 correspond to the signals received by transmit link macro 1514 from the transmit interface 1512 and clock signals. These signals include: LM0_ANA_TXDATA [139:0], LM0_ANA_TXVALID, LM0_ANA_TXCLK, and LM0_C2_TXCLK. The annotation ANA means that these correspond to the analog macro aspect of the link macro. Wave diagrams 1540 show the signals being transmitted by transmit link macro 1514 for serialization and then transport via D2D links (e.g., via an interposer). These signals include: LM0_TX [13:0] and LM0_TXCLK.

Figure 16:
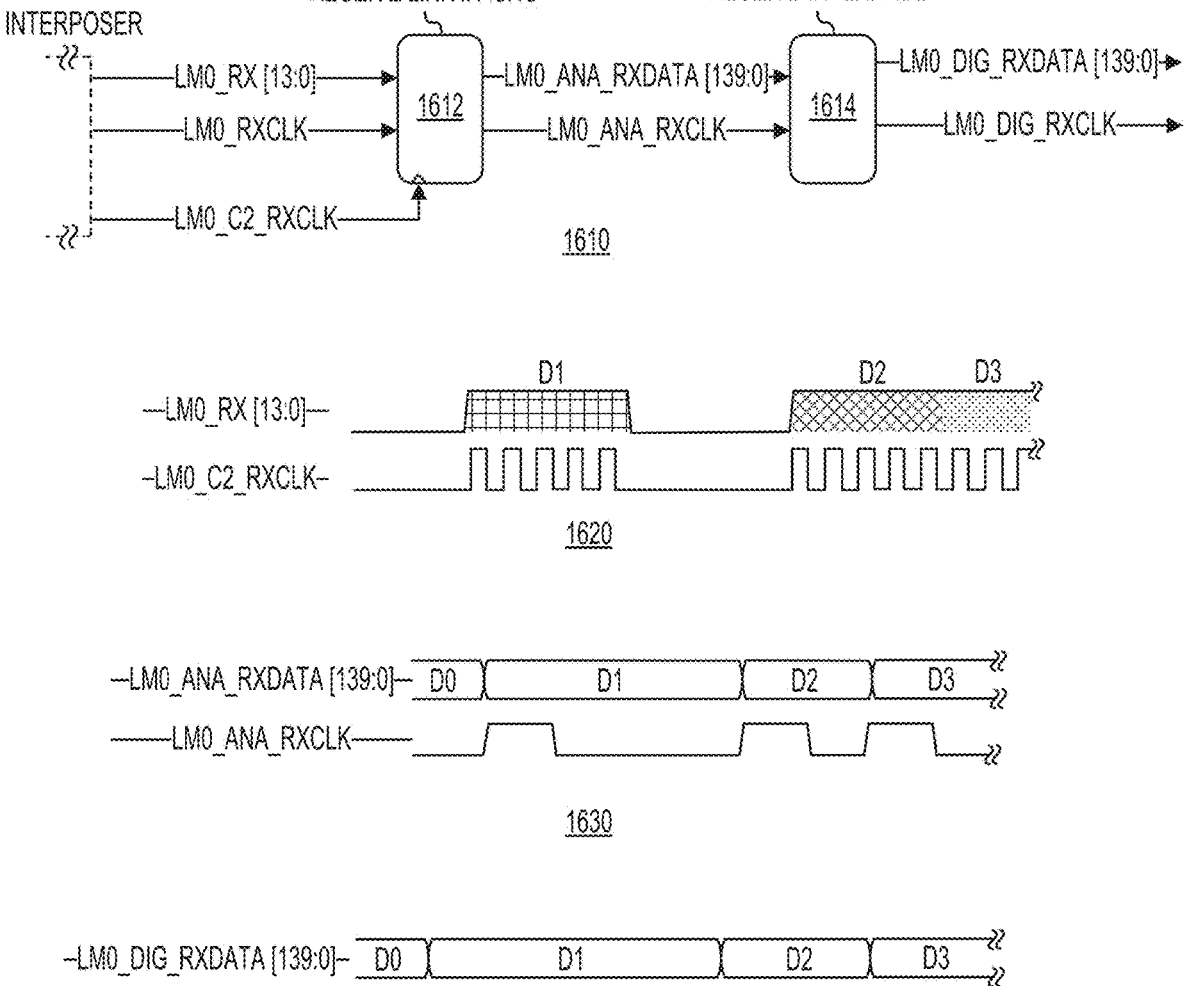
FIG. 16 shows wave diagrams associated with the set of D2D receive link macros of FIG. 14.

FIG. 16 shows wave diagrams 1620, 1630, and 1640 associated with the set of D2D receive link macros of FIG. 14. Wave diagrams 1620, 1630, and 1640 are used to illustrate the data flow along with related signals, including clock signals, for the receive side. In order to explain the data flow, a simplified receive side 1610 is shown as including a receive link macro 1612, which is referred to as LM0 as part of the signals shown in the wave diagrams, and a receive interface 1614. Wave diagrams 1620 correspond to the data signals received by the receive link macro 1612 after the serialized signals transmitted via the D2D links have been de-serialized. These signals include: LM0_RX [13:0] and LM0_RXCLK. Wave diagrams 1630 correspond to the signals received by receive interface 1614 from the receive link macro 1612. These signals include: LM0_ANA_RXDATA[139:0] and LM0_ANA_RXCLK. Once again, the annotation ANA means that these correspond to the analog macro aspect of the link macro. Wave diagrams 1640 show the signals being provided by receive interface 1514 to an SoC channel. These signals include: LM0_DIG_RXDATA[139:0] and LM0_DIG_RXCLK.

Figure 17:
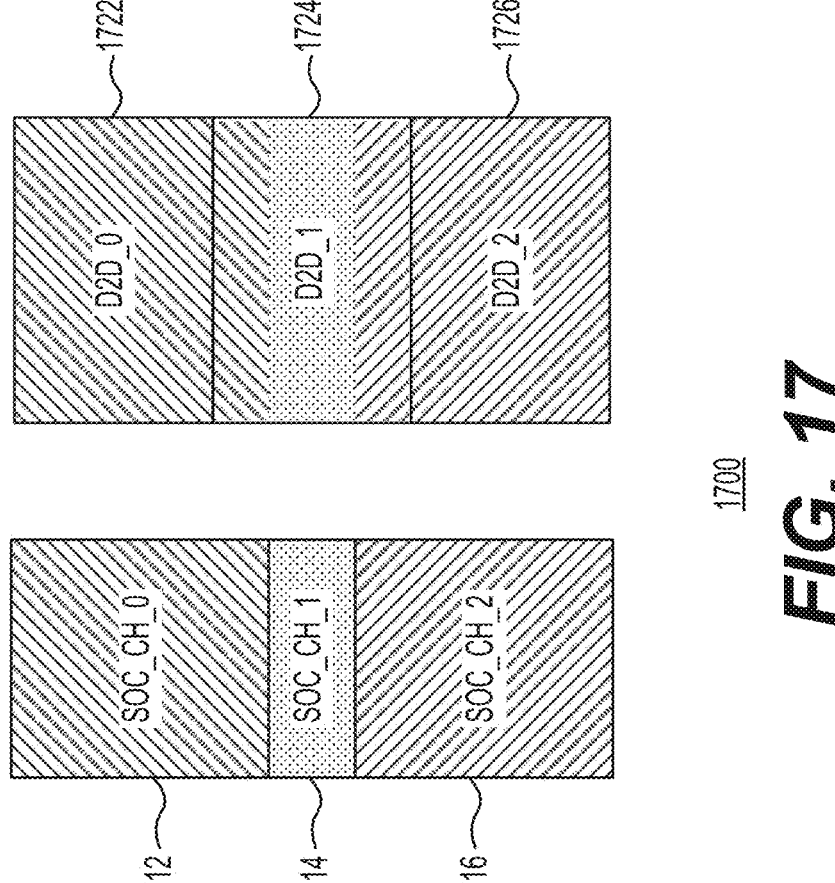
FIG. 17 shows an example transmit data path including SoC channels coupled with modular D2D transmit link macros for use with a multi-die system.

FIG. 17 shows another example transmit data path 1700 including SoC channels coupled with modular D2D transmit link macros for use with a multi-die system. Transmit data path 1700 includes three SoC channels: SOC_CH_0 1712, SOC_CH_1 1714, and SOC_CH_2 1716. In this example, the transmit data path 1700 includes three modular D2D transmit link macros: D2D_0 1722, D2D_1 1724, and D2D_2 1726. This example assumes that SOC_CH_0 1712 requires more bandwidth than offered by a modular transmit link macro. SOC_CH_1 1714 requires less bandwidth than offered by a modular transmit macro. SOC_CH_2 1716 requires more bandwidth than offered by a modular transmit link macro. Thus, this example assumes that each of the modular D2D transmit link macros has the same physical shape, the same size, and the same bandwidth capacity. In this example, each of the modular D2D transmit link macro has 14 data lanes, where each lane is capable of handling 10 bits (e.g., similar to modular D2D transmit link macro 900 of FIG. 9), resulting in the bandwidth capacity of 140 bits. In this example, two out of the three SoC channels have a bandwidth that exceeds the bandwidth capacity of the modular D2D transmit link macro. One of the SoC channels (SOC_CH_1 1714) does not require any ungrouping; however, to make efficient use of the transmit link macros, a shared transmit link macro is used to transport data for this channel. Thus, the data from the first SoC channel (e.g., SOC_CH_0 1712) is ungrouped into a first group of data and a second group of data. Similarly, the data from the third SoC channel (SOC_CH_2 1716) is ungrouped into a third group of data and a fourth group of data. In this example, a first modular D2D transmit link macro (e.g., D2D_0 1722) is configured to transmit the first group of data, a second modular D2D transmit link macro (e.g., D2D_1 1724) is configured to transmit both the second group of data and the third group of data, and the data from the smaller bandwidth channel (SOC_CH_1 1714). A third modular D2D transmit link macro (e.g., D2D_2 1726) is configured to transmit the fourth group of data. At the receive side, the ungrouped channel data is grouped as explained earlier.

Figure 18:
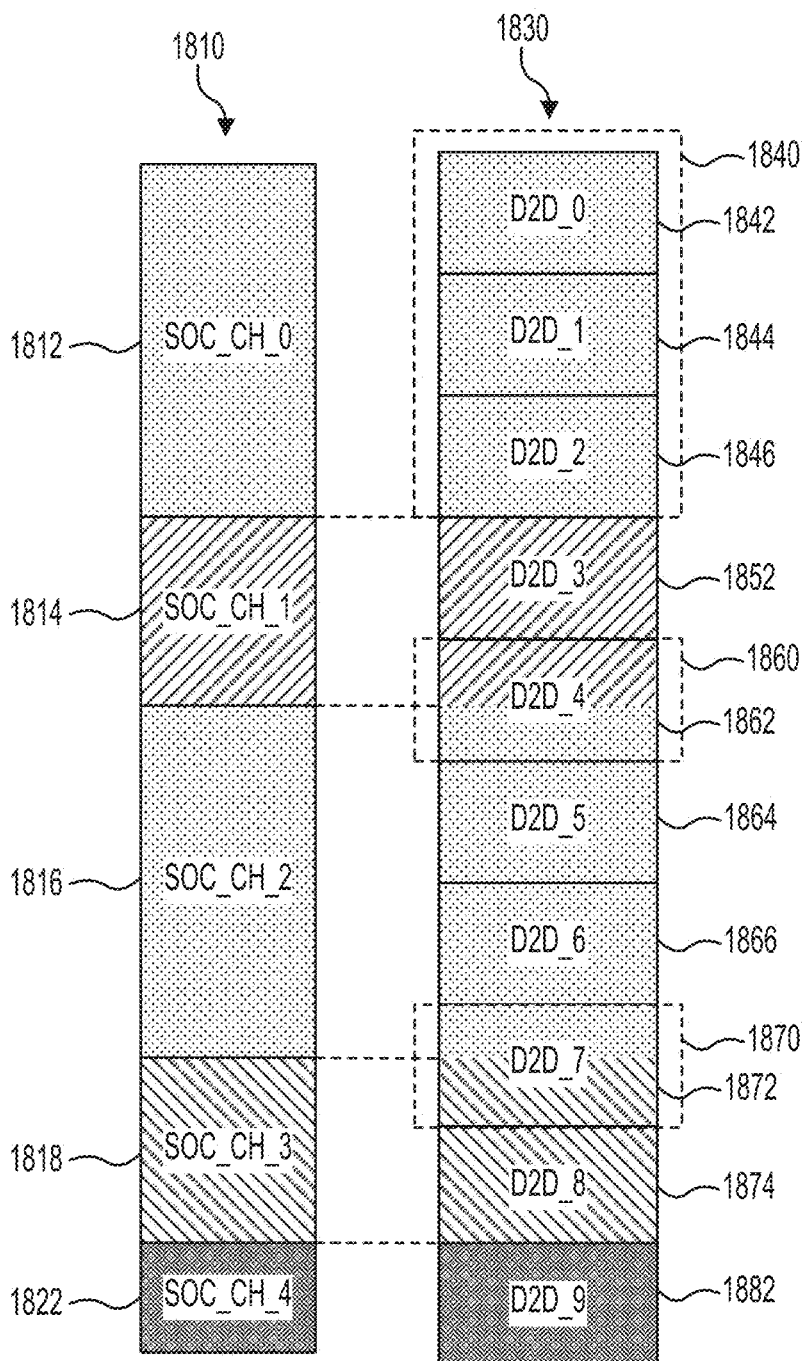
FIG. 18 shows another example transmit data path including SoC channels coupled with modular D2D transmit link macros for use with a multi-die system.

FIG. 18 shows another example transmit data path 1800 including SoC channels coupled with modular D2D transmit link macros for use with a multi-die system. In this example, a set of SoC channels 1810 are coupled to a set of modular D2D transmit link macros 1830. The set of SoC channels 1810 includes: SOC_CH_0 1812, SOC_CH_1 1814, SOC_CH_2 1816, SOC_CH_3, 1818, and SOC_CH_4 1822. The set of modular D2D transmit link macros 1830 includes: D2D_0 1842, D2D_1 1844, D2D_2 1846, D2D_3 1852, D2D_4 1862, D2D_5 1864, D2D_6 1866, D2D_7 1872, D2D_8 1874, and D2D_9 1882. Three transmit link macros D2D_0 1842, D2D_1 1844, and D2D_2 1846 are joined together as part of a set of D2D modular D2D transmit link macros 1840 to enable a much wider bus. This illustrates an ungrouping/grouping example.

With continued reference to FIG. 18, the SoC bus widths can end in the middle of a transmit link macro. If the rest of the transmit link macro is not used, it will have an efficiency impact. To address this issue, as noted earlier, data from multiple SoC channels can be sent via a single transmit link macro. Thus, in this example, the transmit link macro D2D_4 1862 is shared by two SoC channels (SOC_CH_1 1814 and SOC_CH_2 1816) illustrating a joining/splitting example 1860. Similarly, the transmit link macro D2D_7 is shared by the data from two SoC channels (SOC_CH_2 1816 and SOC_CH_3 1818) illustrating another joining/splitting example 1870. As explained earlier, this means that data is joined by the shared link macro and is then split at the receive side. In sum, using the modular D2D transmit link macros and the receive link macros, data from different SoC channels with different bus widths can be ungrouped prior to transmission across the D2D links and can be grouped on the receive side. Similarly, for efficiency reasons, transmit link macros can be joined and split, as needed. Arguably, the most efficient strategy from power consumption and area usage points of view is to custom design each D2D node and transmit macro. This would, however, require a significant amount of design resources for each custom implementation, and would also complicate the testing/debug/manufacturing process. In sum, custom-designed D2D nodes and transmit/receive macros are not the best implementation in terms of the sum total of all costs involved in design, manufacturing, and the testing phases.

Figure 19:
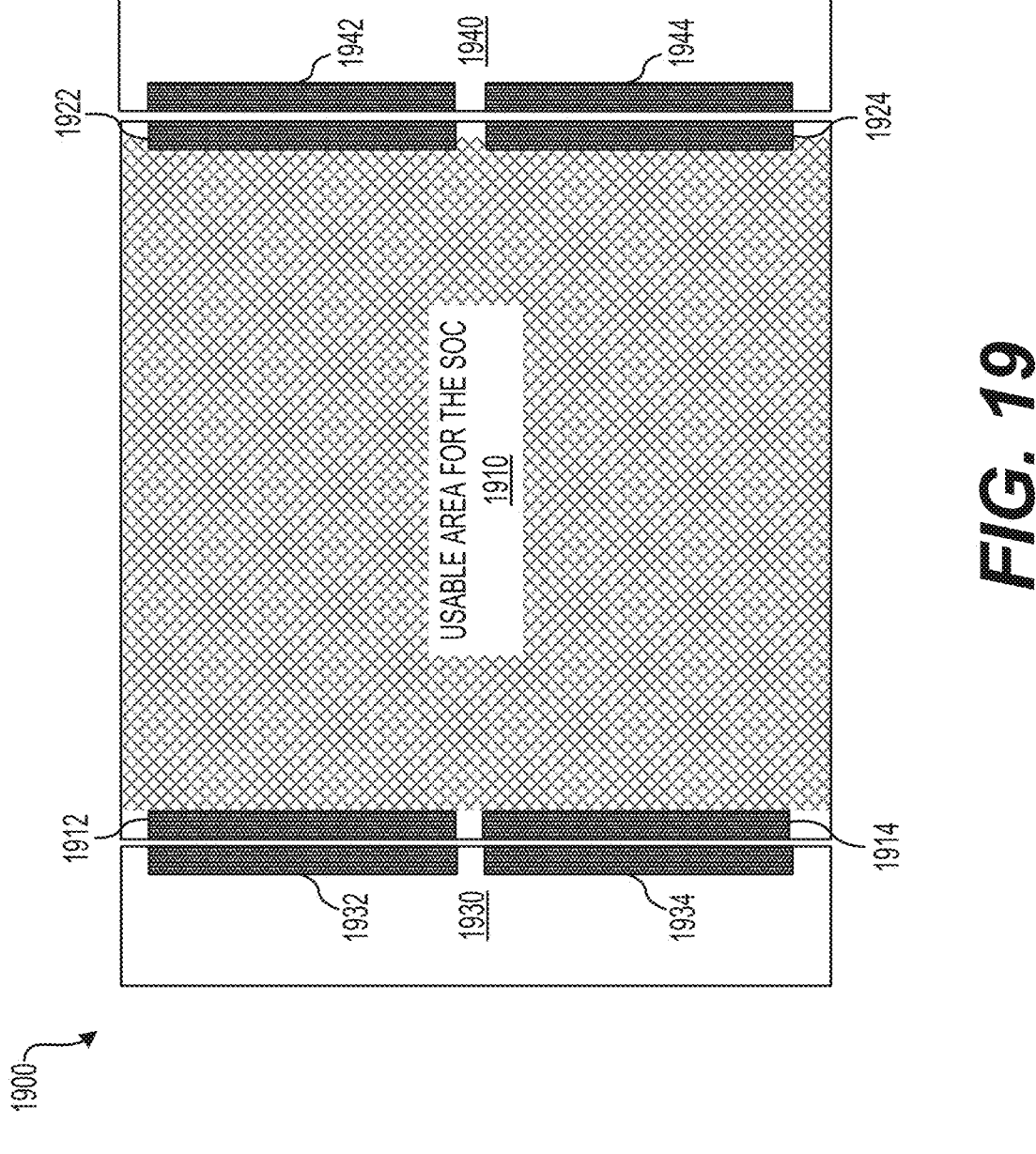
FIGS. 19 and 20 further illustrate the advantages associated with the use of modular D2D link macros for ungrouping and grouping of system busses.
Figure 20:
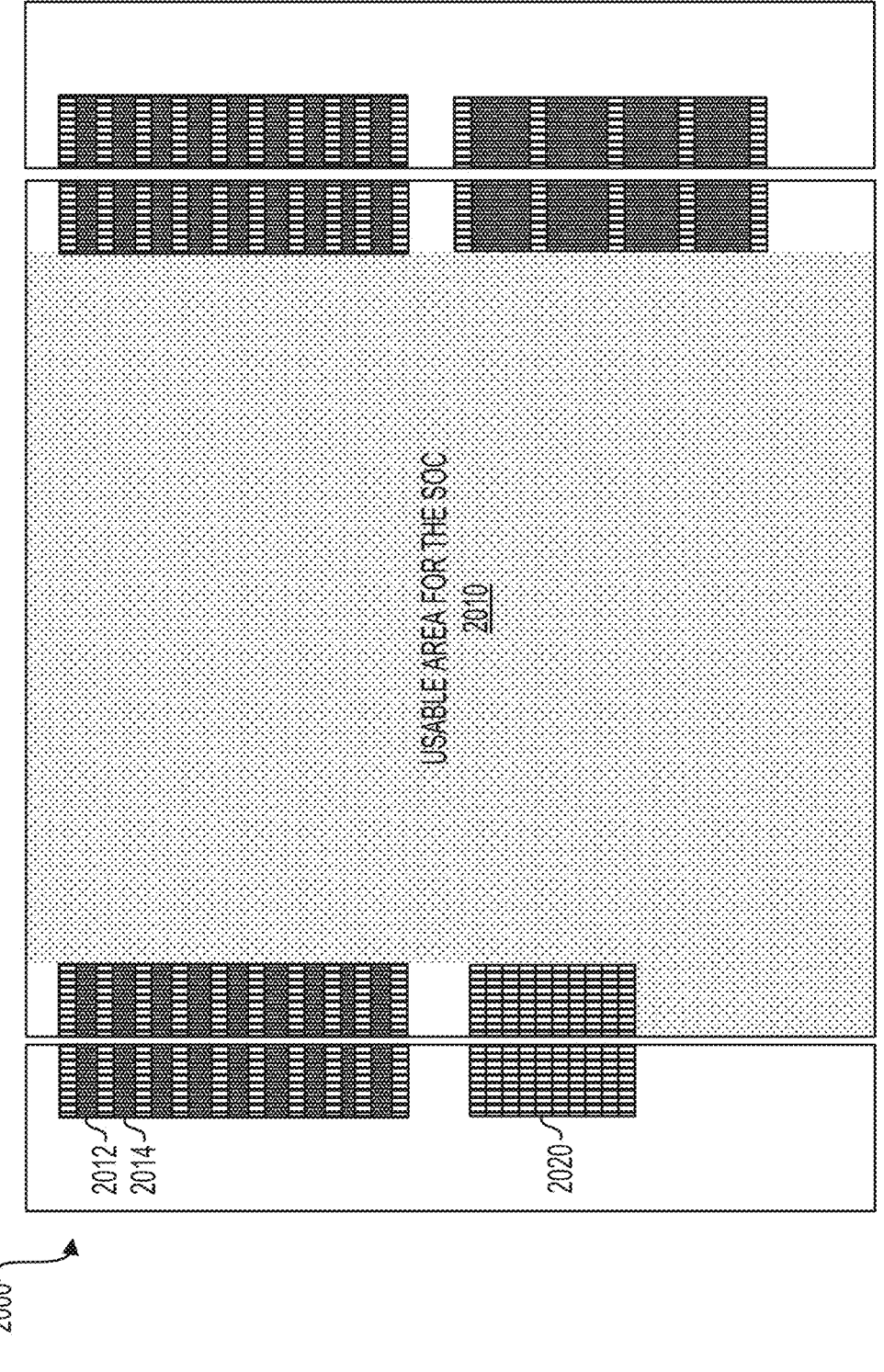

FIGS. 19 and 20 further illustrate the advantages associated with the use of the modular D2D link macros for ungrouping and grouping of system busses. As shown in FIG. 19, the use of modular D2D link macros results in a larger usable area 1910 for the SoC 1900 than the usable area 2010 for the SoC 2000 shown in FIG. 20. SoC 1900 is shown with D2D nodes 1912, 1914, 1922, and 1924 that include the modular D2D link macros described herein. SoC 1900 is coupled to other dies 1930 and 1940, respectively. Die 1930 includes D2D nodes 1932 and 1934 and die 1940 includes D2D nodes 1942 and 1944. As shown in FIG. 20, if the bandwidth is put in the place where it is needed, there are large areas of the SoC that are hard to use for logic within the die. Dark gray areas, such as area 2012 and area 2014 show the wasted space within SoC 2000. If one tries to optimize the area-usage, then as shown by region 2020 in FIG. 20, the fan-in and fan-out areas need to be added to allow for the movement of the data to/from endpoints within the SoC. The addition of the fan-in and fan-out circuitry defeats any area/power savings achieved by placing the transmit/receive logic in close proximity. In other words, the use of modular D2D link macros with grouping/ungrouping and joining/splitting results in more usable area for logic and other components associated with the SoC while at the same time providing flexibility in terms of asymmetric bandwidth and chip edge depth type of constraints.

FIG. 21 shows a flow chart 2100 of a method for grouping and ungrouping of system busses using link macros capable of joining and splitting. The steps shown in flow chart 2100 can be performed using the link macros and other components of the multi-die systems described earlier. As an example, FIG. 8 shows a multi-die system 800 that includes two dies connected via D2D links (e.g., the interposer). Step 2110 includes ungrouping data received from a first system-on-chip (SoC) channel within the first die into a first group of data and a second group of data when a bandwidth of the first SoC channel exceeds the bandwidth capacity per transmit link macro. As explained earlier with respect to FIGS. 13-16, circuitry (e.g., the circuitry shown in FIGS. 10 and 13) can be used to ungroup data received from an SoC channel whose bandwidth exceeds the per transmit link macro bandwidth. As an example, as described earlier an SoC channel that is 225 bits wide cannot be transmitted using a link macro that is only 140 bits wide. Instead, the circuitry described earlier ungroups the SoC channel by sending a first group of the data via one transmit link macro and sending a second group of the data via a different transmit link macro.

Step 2120 includes ungrouping data received from a second SoC channel within the first die into a third group of data and a fourth group of data when a bandwidth of the second SoC channel exceeds the bandwidth capacity per transmit link macro. As explained earlier with respect to FIGS. 13-16, circuitry (e.g., the circuitry shown in FIGS. 10 and 13) can be used to ungroup data received from an SoC channel whose bandwidth exceeds the per transmit link macro bandwidth. As an example, as described earlier an SoC channel that is 225 bits wide cannot be transmitted using a link macro that is only 140 bits wide. Instead, the circuitry described earlier ungroups the SoC channel by sending one group of the data via one transmit link macro and sending another group of the data via a different transmit link macro.

Step 2130 includes, using a first D2D transmit link macro from among the set of modular D2D transmit link macros, transmitting the first group of data to the second die. As explained earlier, with respect to 13-16, circuitry (e.g., the circuitry shown in FIGS. 10 and 13) can be used to transmit a group of data to the second die. As part of this process, the D2D transmit link macro provides the data to be transmitted to a serializer, which can then serialize the data before transmitting the serialized data via D2D links.

Step 2140 includes joining the second group of data with the third group of data, and using a second D2D transmit link macro from among the set of modular D2D transmit link macros, transmitting the joined data to the second die. As explained earlier, with respect to 13-16, circuitry (e.g., the circuitry shown in FIGS. 10 and 13) can be used to transmit a group of data to the second die. As part of this process, the D2D transmit link macro provides the data to be transmitted to a serializer, which can then serialize the data before transmitting the serialized data via D2D links.

Step 2150 includes using a third D2D transmit link macro from among the set of modular D2D transmit link macros, transmitting the fourth group of data to the second die. As explained earlier, with respect to 13-16, circuitry (e.g., the circuitry shown in FIGS. 10 and 13) can be used to transmit a group of data to the second die. As part of this process, the D2D transmit link macro provides the data to be transmitted to a serializer, which can then serialize the data before transmitting the serialized data via D2D links.

In conclusion, the present disclosure relates to a method for communication between a first die and a second die in a multi-die system, where the first die comprises a set of D2D transmit link macros, where each of the set of D2D link transmit macros has a same bandwidth capacity per transmit link macro. The method includes ungrouping data received from a first system-on-chip (SoC) channel within the first die into a first group of data and a second group of data when a bandwidth of the first SoC channel exceeds the bandwidth capacity per transmit link macro.

The method further includes ungrouping data received from a second SoC channel within the first die into a third group of data and a fourth group of data when a bandwidth of the second SoC channel exceeds the bandwidth capacity per transmit link macro. The method further includes using a first D2D transmit link macro from among the set of D2D transmit link macros, transmitting the first group of data to the second die.

The method further includes joining the second group of data with the third group of data, and using a second D2D transmit link macro from among the set of D2D transmit link macros, transmitting the joined data to the second die. The method further includes using a third D2D transmit link macro from among the set of D2D transmit link macros, transmitting the fourth group of data to the second die.

The second die may comprise a set of D2D receive link macros and each of the set of D2D receive link macros may have the same bandwidth capacity per receive link macro as the bandwidth capacity per transmit link macro. The method may further include, using a first D2D receive link macro from the set of D2D receive link macros, receiving the first group of data. The method may further include using a second D2D receive link macro from among the set of D2D receive link macros, receiving the joined data.

The method may further include splitting the joined data, and providing respective data to respective SoC channels for grouping within the second die. The method may further include using a third D2D receive link macro from among the set of D2D receive link macros, receiving the fourth group of data. The method may further include inserting a data valid signal for transmission of any data via any of the set of modular D2D transmit link macros. The method may further include decoding the inserted data valid signal when received by any of the set of D2D receive link macros.

In another example, the present disclosure relates to a multi-die system including a first die coupled to a second die via die-to-die (D2D) links, where the first die comprises a first plurality of die-to-die (D2D) nodes, where each of the first plurality of D2D nodes comprises a set of modular D2D transmit link macros, and where each of the set of modular D2D transmit link macros has a same physical shape, size, and a bandwidth capacity per transmit link macro. The multi-die system is configured to ungroup data received from a first system-on-chip (SoC) channel within the first die into a first group of data and a second group of data when a bandwidth of the first SoC channel exceeds the bandwidth capacity.

The multi-die system is further configured to ungroup data received from a second SoC channel within the first die into a third group of data and a fourth group of data when a bandwidth of the second SoC channel exceeds the bandwidth capacity. The multi-die system is further configured to, using a first D2D transmit link macro from among the set of modular D2D transmit link macros within the first die, transmit the first group of data to the second die.

The multi-die system is further configured to join the second group of data with the third group of data, and using a second D2D transmit link macro from among the set of modular D2D transmit link macros within the first die, transmit the joined data to the second die. The multi-die system is further configured to, using a third D2D transmit link macro from among the set of modular D2D transmit link macros within the first die, transmit the fourth group of data to the second die.

The second die may comprise a second plurality of die-to-die (D2D) nodes, where each of the second plurality of D2D nodes comprises a set of modular D2D receive link macros. Each of the set of modular D2D receive link macros may have the same physical shape, size, and the bandwidth capacity as each of the set of modular D2D transmit link macros. The multi-die system may be configured to, using a first modular D2D receive link macro from the set of modular D2D receive link macros within the second die, receive the first group of data.

The multi-die system may further be configured to using a second modular D2D receive link macro from among the set of modular D2D receive link macros within the second die, receive the joined data. The multi-die system may further be configured to within the second die split the joined data and provide respective data to respective SoC channels for grouping within the second die.

The multi-die system may further be configured to using a third modular D2D receive link macro from among the set of modular D2D receive link macros within the second die, receive the fourth group of data. The multi-die system may further be configured to: (1) insert a data valid signal for transmission of any data via any of the set of modular D2D transmit link macros within the first die, and (2) decode the inserted data valid signal when received by any of set of modular D2D receive link macros within the second die.

In yet another example, the present disclosure relates to a method for coupling a first die with a second die in a multi-die system, where the first die comprises a first plurality of die-to-die (D2D) nodes, where each of the first plurality of D2D nodes comprises a set of modular D2D transmit link macros, and where each of the set of modular D2D link transmit macros has a same physical shape, size, and a bandwidth capacity per transmit link macro. The method includes ungrouping data received from a first system-on-chip (SoC) channel within the first die into a first group of data and a second group of data when a bandwidth of the first SoC channel exceeds the bandwidth capacity per transmit link macro.

The method further includes ungrouping data received from a second SoC channel within the first die into a third group of data and a fourth group of data when a bandwidth of the second SoC channel exceeds the bandwidth capacity per transmit link macro. The method further includes, using a first D2D transmit link macro from among the set of modular D2D transmit link macros, transmitting the first group of data to the second die.

The method further includes joining the second group of data with the third group of data, and using a second D2D transmit link macro from among the set of modular D2D transmit link macros, transmitting the joined data to the second die. The method further includes, joining the second group of data with the third group of data, and using a second D2D transmit link macro from among the set of modular D2D transmit link macros, transmitting the joined data to the second die.

The second die may comprise a second plurality of die-to-die (D2D) nodes, where each of the second plurality of D2D nodes comprises a set of modular D2D receive link macros. Each of the set of modular D2D receive link macros may have the same physical shape, size, and the bandwidth capacity per receive link macro as each of the set of modular D2D transmit link macros. The method may further include, using a first modular D2D receive link macro from the set of modular D2D receive link macros, receiving the first group of data.

The method may further include using a second modular D2D receive link macro from among the set of modular D2D receive link macros, receiving the joined data. The method may further include splitting the joined data, and providing respective data to respective SoC channels for grouping within the second die. The method may further include using a third modular D2D receive link macro from among the set of modular D2D receive link macros, receiving the fourth group of data.

The method may further include inserting a data valid signal for transmission of any data via any of the set of modular D2D transmit link macros. The method may further include decoding the inserted data valid signal when received by any of set of modular D2D receive link macros.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), or Complex Programmable Logic Devices (CPLDs). In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for communication between a first die and a second die in a multi-die system, comprising:
   ungrouping data received from a first system-on-chip (SoC) channel within the first die into a first group of data and a second group of data when a bandwidth of the first SoC channel exceeds a bandwidth capacity per transmit link macro, wherein the first die comprises a set of die-to-die (D2D) transmit link macros, and wherein each of the set of D2D link transmit macros has the bandwidth capacity per transmit link macro;
   ungrouping data received from a second SoC channel within the first die into a third group of data and a fourth group of data when a bandwidth of the second SoC channel exceeds the bandwidth capacity per transmit link macro;
   transmitting, using a first D2D transmit link macro from among the set of D2D transmit link macros, the first group of data to the second die;
   joining the second group of data with the third group of data, and using a second D2D transmit link macro from among the set of D2D transmit link macros, transmitting the joined data to the second die; and
   transmitting, using a third D2D transmit link macro from among the set of D2D transmit link macros, the fourth group of data to the second die.

2. The method of claim 1, wherein the second die comprises a set of D2D receive link macros, and wherein each of the set of D2D receive link macros has a same bandwidth capacity per receive link macro as the bandwidth capacity per transmit link macro, the method further comprising, using a first D2D receive link macro from the set of D2D receive link macros, receiving the first group of data.

3. The method of claim 2, further comprising, receiving the joined data using a second D2D receive link macro from among the set of D2D receive link macros.

4. The method of claim 3, further splitting the joined data, and providing respective data to respective SoC channels for grouping within the second die.

5. The method of claim 4, further comprising, receiving the fourth group of data using a third D2D receive link macro from among the set of D2D receive link macros.

6. The method of claim 5, further comprising inserting a data valid signal for transmission of any data via any of the set of modular D2D transmit link macros.

7. The method of claim 6, further comprising decoding the inserted data valid signal when received by any of the set of D2D receive link macros.

8. A multi-die system comprising:
   a die-to-die (D2D) link; and
   a first die coupled to the D2D link, wherein the first die comprises a first plurality of D2D nodes, wherein each of the first plurality of D2D nodes comprises a set of modular D2D transmit link macros, and wherein each of the set of modular D2D transmit link macros has a same physical shape, size, and a bandwidth capacity per transmit link macro, the multi-die system to:
   ungroup data received from a first system-on-chip (SoC) channel within the first die into a first group of data and a second group of data when a bandwidth of the first SoC channel exceeds the bandwidth capacity;
   ungroup data received from a second SoC channel within the first die into a third group of data and a fourth group of data when a bandwidth of the second SoC channel exceeds the bandwidth capacity;
   transmit, using a first D2D transmit link macro from among the set of modular D2D transmit link macros within the first die, the first group of data to a second die;
   join the second group of data with the third group of data;

transmit, using a second D2D transmit link macro from among the set of modular D2D transmit link macros within the first die, the joined data to the second die; and transmit, using a third D2D transmit link macro from among the set of modular D2D transmit link macros within the first die, the fourth group of data to the second die.

9. The multi-die system of claim 8, wherein the second die comprises a second plurality of die-to-die (D2D) nodes, wherein each of the second plurality of D2D nodes comprises a set of modular D2D receive link macros, and wherein each of the set of modular D2D receive link macros has the same physical shape, size, and the bandwidth capacity as each of the set of modular D2D transmit link macros, and wherein the multi-die system is to, receive the first group of data using a first modular D2D receive link macro from the set of modular D2D receive link macros within the second die.

10. The multi-die system of claim 9, further configured to, receive the joined data using a second modular D2D receive link macro from among the set of modular D2D receive link macros within the second die.

11. The multi-die system of claim 10, further configured to, within the second die split the joined data and provide respective data to respective SoC channels for grouping within the second die.

12. The multi-die system of claim 11, further configured to, receive the fourth group of data using a third modular D2D receive link macro from among the set of modular D2D receive link macros within the second die.

13. The multi-die system of claim 12, further configured to: (1) insert a data valid signal for transmission of any data via any of the set of modular D2D transmit link macros within the first die, and (2) decode the inserted data valid signal when received by any of set of modular D2D receive link macros within the second die.

14. A method for coupling a first die with a second die in a multi-die system, the method comprising:

ungrouping data received from a first system-on-chip (SoC) channel within the first die into a first group of data and a second group of data when a bandwidth of the first SoC channel exceeds a bandwidth capacity per transmit link macro, wherein the first die comprises a first plurality of die-to-die (D2D) nodes, wherein each of the first plurality of D2D nodes comprises a set of modular D2D transmit link macros, and wherein each of the set of modular D2D link transmit macros has a same physical shape, size, and a bandwidth capacity per transmit link macro;

ungrouping data received from a second SoC channel within the first die into a third group of data and a fourth group of data when a bandwidth of the second SoC channel exceeds the bandwidth capacity per transmit link macro;

transmitting, using a first D2D transmit link macro from among the set of modular D2D transmit link macros, the first group of data to the second die;

joining the second group of data with the third group of data;

transmitting, using a second D2D transmit link macro from among the set of modular D2D transmit link macros, the joined data to the second die; and transmitting, using a third D2D transmit link macro from among the set of modular D2D transmit link macros, the fourth group of data to the second die.

15. The method of claim 14, wherein the second die comprises a second plurality of die-to-die (D2D) nodes, wherein each of the second plurality of D2D nodes comprises a set of modular D2D receive link macros, and wherein each of the set of modular D2D receive link macros has the same physical shape, size, and the bandwidth capacity per receive link macro as each of the set of modular D2D transmit link macros, the method further comprising, receiving the first group of data using a first modular D2D receive link macro from the set of modular D2D receive link macros.

16. The method of claim 15, further comprising, receiving the joined data using a second modular D2D receive link macro from among the set of modular D2D receive link macros.

17. The method of claim 16, further splitting the joined data, and providing respective data to respective SoC channels for grouping within the second die.

18. The method of claim 17, further comprising, receiving the fourth group of data using a third modular D2D receive link macro from among the set of modular D2D receive link macros.

19. The method of claim 18, further comprising inserting a data valid signal for transmission of any data via any of the set of modular D2D transmit link macros.

20. The method of claim 19, further comprising decoding the inserted data valid signal when received by any of set of modular D2D receive link macros.

* * * * *